(12) United States Patent
Olsen et al.

(10) Patent No.: US 11,762,622 B1
(45) Date of Patent: Sep. 19, 2023

(54) INTERACTIVE REMOTE DIGITAL IMAGE EDITING UTILIZING A SCALABLE CONTAINERIZED ARCHITECTURE

(71) Applicant: Adobe Inc., San Jose, CA (US)

(72) Inventors: Sven Olsen, Victoria (CA); Shabnam Ghadar, Menlo Park, CA (US); Baldo Faieta, San Francisco, CA (US); Akhilesh Kumar, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/663,635

(22) Filed: May 16, 2022

(51) Int. Cl.
  *G06F 3/14* (2006.01)
  *G06T 11/60* (2006.01)

(52) U.S. Cl.
  CPC .......... *G06F 3/1462* (2013.01); *G06F 3/1407* (2013.01); *G06F 3/1415* (2013.01); *G06T 11/60* (2013.01)

(58) Field of Classification Search
  CPC .... G06F 3/1462; G06F 3/1407; G06F 3/1415; G06F 40/166; G06T 11/60; G06T 3/4046; G06T 2200/24; G06T 2207/20084; G06T 2207/20081; G06T 2207/20092
  See application file for complete search history.

(56) References Cited

U.S. PATENT DOCUMENTS

| | | | | |
|---|---|---|---|---|
| 2018/0225812 A1* | 8/2018 | DiVerdi | ............... | G06V 10/764 |
| 2021/0158933 A1* | 5/2021 | Frosch | .................. | G16H 40/67 |
| 2022/0375024 A1* | 11/2022 | Luo | ........................ | G06T 3/0012 |
| 2022/0383570 A1* | 12/2022 | Ling | ..................... | G06V 10/774 |
| 2022/0414959 A1* | 12/2022 | Peng | ..................... | G06V 10/774 |
| 2023/0022550 A1* | 1/2023 | Guo | ........................ | G06T 11/001 |
| 2023/0071661 A1* | 3/2023 | Peng | ........................ | G06T 11/60 |
| 2023/0072759 A1* | 3/2023 | Zhang | ..................... | G06T 11/00 |
| 2023/0146676 A1* | 5/2023 | Liu | ........................ | G06T 11/001 |
| | | | | 382/157 |
| 2023/0162320 A1* | 5/2023 | Song | ........................ | G06T 5/50 |
| | | | | 382/100 |

* cited by examiner

*Primary Examiner* — Jin Cheng Wang
(74) *Attorney, Agent, or Firm* — Keller Preece PLLC

(57) ABSTRACT

The present disclosure relates to systems, methods, and non-transitory computer readable media for remotely generating modified digital images utilizing an interactive image editing architecture. For example, the disclosed systems receive an image editing request for remotely editing a digital image utilizing an interactive image editing architecture. In some cases, the disclosed systems maintain, via a canvas worker container, a digital stream that reflects versions of the digital image. The disclosed systems determine, from the digital stream utilizing the canvas worker container, an image differential metric indicating a difference between a first version of the digital image and a second version of the digital image associated with the image editing request. Further, the disclosed systems provide the image differential metric to a client device for rendering the second version of the digital image to reflect a modification corresponding to the user interaction.

20 Claims, 11 Drawing Sheets

1000

Receiving An Indication For Remotely Editing A Digital Image Utilizing An Interactive Image Editing Architecture *1002*

Generating A Modification To The Digital Image According To The Indication *1004*

Determining An Image Differential Metric *1006*

Maintaining A Digital Stream That Reflects Versions Of The Digital Image *1008*

Comparing A First Version Of The Digital Image And A Second Version Of The Digital Image *1010*

Providing The Image Differential Metric To A Client Device *1012*

INTERACTIVE REMOTE DIGITAL IMAGE EDITING UTILIZING A SCALABLE CONTAINERIZED ARCHITECTURE

BACKGROUND

In the field of digital image editing, deep generative models have become increasingly effective in various applications, such as producing realistic images from randomly sampled seeds or image inpainting. These models, such as generative adversarial networks ("GANs"), have revolutionized digital image synthesis, enabling digital image modifications by extracting and combining features across digital images. Indeed, GANs have made significant progress in adjusting features that correspond to individual GAN-based visual attributes (e.g., age, anger, surprise, or happiness). Despite the advances of conventional digital image systems that utilize these models, however, these conventional systems continue to suffer from a number of disadvantages, such as computational inefficiency which leads to an inability to accommodate large numbers of remote digital image editing operations.

SUMMARY

This disclosure describes one or more embodiments of systems, methods, and non-transitory computer readable media that solve one or more of the foregoing or other problems in the art by utilizing a containerized architecture to determine image differential metrics (e.g., image deltas) for remote digital image editing. For example, the disclosed systems utilize a container orchestration engine to operate or facilitate an interactive image editing architecture that includes a canvas worker container, a set of graphical processors, and a backend editing controller. In some embodiments, by utilizing the containerized architecture disclosed herein, the disclosed systems accommodate large numbers of (and/or high frequencies of) image editing requests from many client devices for interactive (e.g., real-time) remote image editing.

BRIEF DESCRIPTION OF THE DRAWINGS

This disclosure describes one or more embodiments of the invention with additional specificity and detail by referencing the accompanying figures. The following paragraphs briefly describe those figures, in which:

FIG. 10 illustrates a flowchart of a series of acts for remotely generating a modified digital image utilizing an interactive image editing architecture in accordance with one or more embodiments.

DETAILED DESCRIPTION

Figure 1:
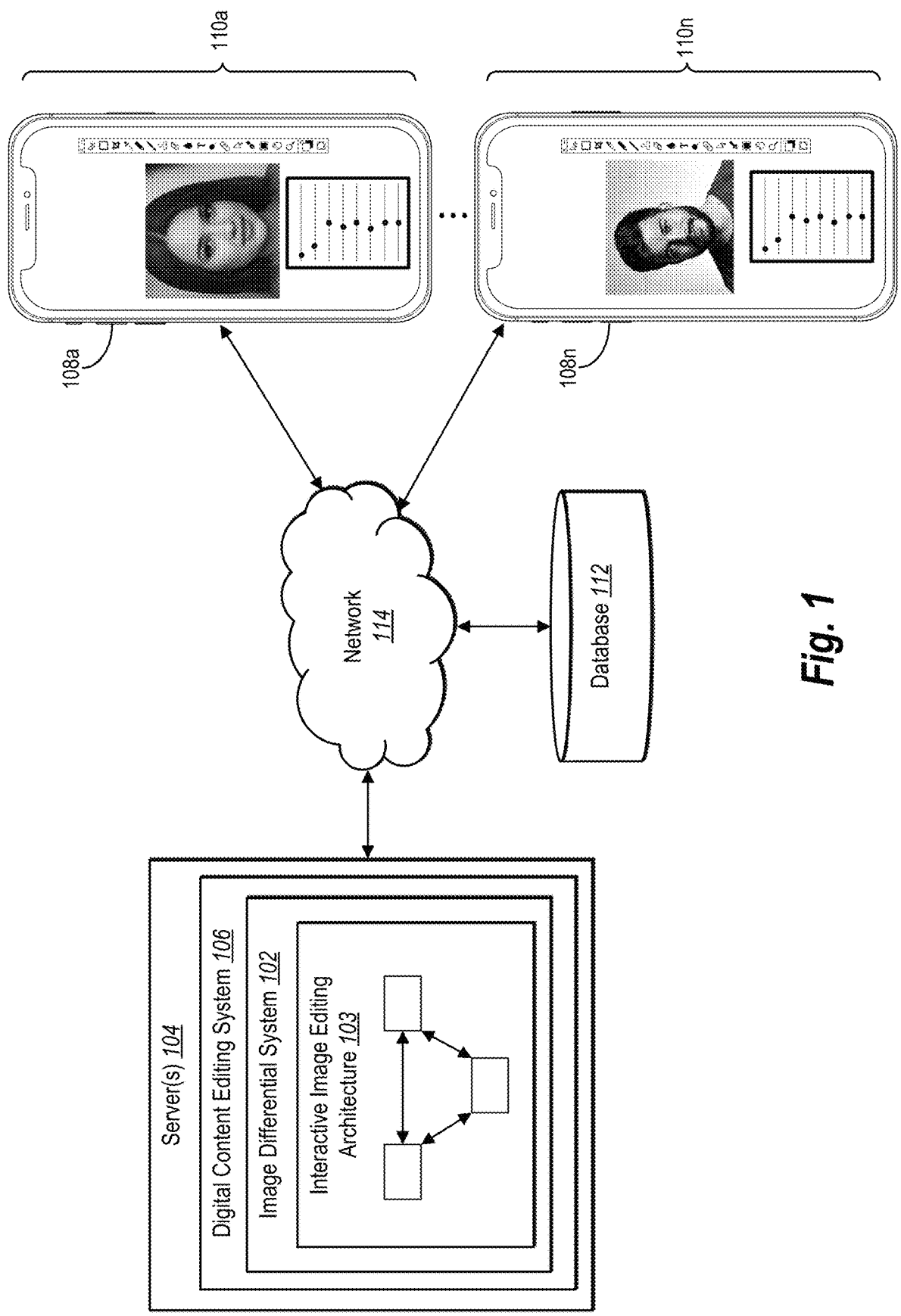
FIG. 1 illustrates an example system environment in which an image differential system operates in accordance with one or more embodiments.

This disclosure describes one or more embodiments of an image differential system that receives digital image editing requests (e.g., in rapid succession from many client devices) and utilizes an interactive image editing architecture (e.g., via a container orchestration engine) to generate and modify latent image vectors according to the image editing requests and to generate and provide image differential metrics based on the modified latent image vectors. In practical scenarios, many client devices extemporaneously communicate with a cloud-based remote image editing service at a time, each communicating their own respective indications of user interactions for modifying digital images. To date, the computational inefficiencies of many existing digital image systems prevent them flexibly adapting to accommodate such large numbers and/or frequencies of remote digital image modifications. Motivated by this issue, the image differential system leverages a novel containerized architecture that automatically scales with volume to more efficiently process image editing requests, where the containerized architecture includes (one or more of) a canvas worker container, a set of graphical processors, and/or a backend editing controller.

As just mentioned, in one or more embodiments, the image differential system utilizes an interactive image editing architecture to perform remote digital image modifications. For example, the image differential system utilizes a container orchestration engine (e.g., Kubernetes) to implement or apply various containers to perform respective functions or tasks as part of modifying a digital image. In some cases, the image differential system receives an indication of a user interaction with a client device to edit a digital image. In some implementations, the image differential system receives many such indications in rapid succession to perform many image modifications quickly. The image differential system performs these many image modifications by orchestrating (e.g., via an orchestration engine) processes of various containerized components of the interactive image editing architecture, such as a canvas worker container, a set of graphical processors, and a backend editing controller. By utilizing the disclosed architecture, the image differential system is able to (remotely) generate and provide modified digital images for many devices and/or many editing requests in an interactive (e.g., real-time or near real-time) fashion.

As mentioned, in some embodiments, the image differential system utilizes a canvas worker container as part of an interactive image editing architecture. For instance, the image differential system utilizes the canvas worker container to manage image editing requests and to generate image differential metrics indicating differences between initial images and modified images. In many cases, the image differential system receives image editing requests at a frequency that is too fast for graphical processors to perform the edits one at a time as they are received. To accommodate such large numbers (and/or high frequencies) of image edits while still performing the edits quickly enough for real-time interactive editing at client devices, in certain cases, the image differential system utilizes the canvas worker container to throttle received image editing requests according to a graphical processing capacity of a set of graphical processors. For instance, the image differential system generates or groups batches of image editing requests and assigns the batches to the set of graphical processors in a manner that keeps the graphical processors operating efficiently at capacity without overloading and bogging down (e.g., to perform batches of many edits at a time across the many threads of the graphical processors).

In one or more embodiments, the image differential system further utilizes the canvas worker container to determine image differential metrics. To elaborate, in some cases, the image differential system compares digital images (or corresponding latent image vectors) to determine an image differential metric (or an image delta) that represents the differences or discrepancies between the compared images. For instance, the image differential system utilizes the canvas worker container to compare an initial version of a digital image (e.g., before an edit or a modification) with a modified version of the digital image (as generated by the set of graphical processors based on a user interaction).

In some embodiments, the image differential system generates and maintains a digital stream (e.g., digital video stream or a digital stream of modifiable image data) that mirrors or reflects versions of a digital image as they are presented and modified on a client device. Thus, in some cases, the image differential system utilizes the canvas worker container to compare a first version (or a first frame) from the digital stream with a second version (or a second frame) of the digital stream to determine an image differential metric that indicates a particular image modification. In certain cases, the image differential system utilizes the canvas worker container to determine an image differential metric for each image editing request or each modification made in response to a user interaction to edit a digital image via a client device.

As also mentioned, in certain embodiments, the image differential system utilizes a set of graphical processors and/or a backend editing controller as part of an interactive image editing architecture. For example, the image differential system utilizes the backend editing controller to maintain or manage an application session for modifying a digital image via a client application on a client device. In some cases, the image differential system further utilizes the backend editing controller to determine or generate a latent image vector that represents a digital image in vector form. Further, in some embodiments, the image differential system utilizes the backend editing controller to generate a modified latent image vector that represents a vectorized version of a modified digital image based on a user interaction to perform an edit via a client device.

In certain embodiments, the image differential system utilizes the set of graphical processors to generate a modified digital image from a modified latent image vector. For example, the image differential system utilizes the set of graphical processors to execute or utilize a machine learning model, such as an image modification neural network, to generate a modified digital image from the modified latent image vector. In some cases, the image differential system further utilizes the canvas worker container to update a digital stream to reflect the modified digital image and to further compare the modified digital image (or the modified latent image vector) with a prior version of the digital image (or an unmodified latent image vector) to generate an image differential metric. In some embodiments, the image differential system further utilizes the canvas worker container to provide the image differential metric (e.g., as part of the digital stream between the canvas worker container and a client device) to the client device for rendering the modified digital image.

As suggested above, many conventional digital image systems exhibit a number of shortcomings or disadvantages, particularly in computational efficiency and flexibility. For example, in the field of remote (e.g., cloud-based) digital image editing, some existing systems inefficiently attempt to process individual image editing requests one at a time as they are received. While this may function passably for relatively small numbers of requests, graphical processors are generally too slow (and digital image modifications are too complex) to keep up with large numbers of image editing requests across many client devices (e.g., in the hundreds or thousands of requests per second). By utilizing such a piecewise approach, conventional systems also waste graphical processing capacity of graphical processors that could otherwise handle heavier loads, instead assigning individual requests as they are received.

In addition, some existing systems generate and transmit entirely new digital images for each individual image editing request. This often results in conventional systems generating and transmitting many digital images for a single editing session of a single image, not to mention the many more digital images to generate and provide across many different editing sessions at many different devices. Generating and transmitting such large numbers of digital images (e.g., at the pixel level) consumes an excessive amount of computational resources, such as processing power and memory. Additionally, attempting to generate and provide an updated image for each request as it is received often results in delays and slowdowns where client devices wait long periods to finally reflect image edits.

Due at least in part to their computational inefficiency, some conventional digital image systems are also inflexible. For example, many existing systems are too slow to perform remote image editing interactively, especially for large volumes (or high frequencies) of requests. Indeed, the sluggishness of existing systems is amplified when image editing requests are received from many client devices and/or where each client device provides a sequence of editing requests for progressively editing a digital image. Such large numbers and/or such high frequencies of requests often overburdens existing systems to the point where they are nonfunctional or at least impractical. In addition, many existing systems have fixed architectures that process image editing requests uniformly, irrespective of request numbers (or processing loads). In attempting to accommodate higher request loads, some existing systems use stateless servers to handle image editing requests, but the statelessness of these servers renders maintaining a persistent digital stream for delta frame encoding (e.g., for generating image differential metrics) impossible.

As suggested above, embodiments of the image differential system provide a variety of improvements or advantages over conventional image modification systems. For example, embodiments of the image differential system utilize a novel containerized architecture not found in prior systems. To elaborate, the image differential system utilizes an interactive image editing architecture that includes a canvas worker container, a set of graphical processors, and a backend editing controller. For example, the image differential system utilizes a cloud-based, remote interactive image editing architecture to facilitate fast, interactive digital image modifications (e.g., for real-time, on-the-fly image editing).

Due at least in part to implementing a new image editing architecture, in some embodiments, the image differential system improves efficiency over conventional digital image systems. While some existing systems process image editing requests one a time as they are received, in some embodiments, the image differential system utilizes a canvas worker container to throttle image editing requests for providing to graphical processors by, for instance, batching requests and loading the graphical processors with batched requests to generate fast, efficient image modifications (without wasting unused graphical processing capacity) in groups.

In addition, while many conventional systems generate and provide entirely new digital images for each image editing request, the image differential system preserves large amounts of computing resources by generating and providing (relatively small) image differential metrics reflecting image modifications. Indeed, rather than consuming considerable processing power to generate entirely new digital images for each edit across each device, the image differential system determines and provides image differential metrics that instruct a client device to render modifications to a digital image by using much less processing power based on changes or deltas resulting from user interactions.

Additionally, embodiments of the image differential system also improve flexibility over conventional digital image systems. For example, in some embodiments, the image differential system is much faster than conventional systems and is therefore adaptable to much larger numbers and/or higher frequencies of image editing requests. In some cases, because the image differential system utilizes the disclosed image editing architecture, the image differential system generates and provides image differential metrics to cause client devices to render modified digital images (e.g., from the image differential metrics) in an interactive fashion, even for large numbers of edits across large numbers of devices. In addition, certain embodiments of the image differential system utilize an interactive image editing architecture that is also scalable with load, where the container sizes/capacities of the constituent components dynamically adjust to accommodate varying numbers/frequencies of image editing requests (e.g., for flexible and efficient deployment, reducing capacity to prevent waste in cases of fewer requests and adaptively increasing capacity to for more requests to maintain the interactive nature).

Additional detail regarding the image differential system will now be provided with reference to the figures. For example, FIG. 1 illustrates a schematic diagram of an example system environment for implementing an image differential system 102 in accordance with one or more embodiments. An overview of the image differential system 102 is described in relation to FIG. 1. Thereafter, a more detailed description of the components and processes of the image differential system 102 is provided in relation to the subsequent figures.

As shown, the environment includes server(s) 104, client devices 108a-108n, a database 112, and a network 114. Each of the components of the environment communicate via the network 114, and the network 114 is any suitable network over which computing devices communicate. Example networks are discussed in more detail below in relation to FIG. 11.

As mentioned, the environment includes client devices 108a-108n. The client devices 108a-108n are one of a variety of computing devices, including a smartphone, a tablet, a smart television, a desktop computer, a laptop computer, a virtual reality device, an augmented reality device, or another computing device as described in relation to FIG. 11. The client devices 108a-108n communicate with the server(s) 104 via the network 114. For example, the client devices 108a-108n provide information to server(s) 104 indicating client device interactions (e.g., digital image selections, image editing requests indicating user interactions requesting generation or modification of digital images, or other input) and receive information from the server(s) 104 such as modified digital images or image differential metrics. Thus, in some cases, the image differential system 102 on the server(s) 104 provides and receives information based on client device interaction via the client devices 108a-108n.

As shown in FIG. 1, the client devices 108a-108n include client applications 110a-110n. In particular, the client applications 110a-110n are a web application, a native application installed on the client devices 108a-108n (e.g., a mobile application, a desktop application, etc.), or a cloud-based application where all or part of the functionality is performed by the server(s) 104. Based on instructions from the client applications 110a-110n, the client devices 108a-108n present or display information to a user, including digital images such as modified digital images and/or selectable options for generating and editing digital images. In some cases, the client applications 110a-110n include all or part of the image differential system 102 and/or the interactive image editing architecture 103.

As illustrated in FIG. 1, the environment includes the server(s) 104. The server(s) 104 generates, tracks, stores, processes, receives, and transmits electronic data, such as image editing requests and/or image differential metrics. For example, the server(s) 104 receives data from the one of the client devices 108a-108n in the form of an indication of a client device interaction to edit or modify a digital image. In response, the server(s) 104 transmits data (e.g., an image differential metric) to the client device to cause the client devices 108a-108n to display or present a modified digital image based on the image editing request.

In some embodiments, the server(s) 104 communicates with the client devices 108a-108n to transmit and/or receive data via the network 114, including client device interactions, image editing requests, image differential metrics, and/or other data. In some embodiments, the server(s) 104 comprises a distributed server where the server(s) 104 includes a number of server devices distributed across the network 114 and located in different physical locations. The server(s) 104 comprise a content server, an application server, a communication server, a web-hosting server, a multidimensional server, a container orchestration server, or a machine learning server. The server(s) 104 further access and utilize the database 112 to store and retrieve information such as stored digital images and/or generated image differential metrics.

As further shown in FIG. 1, the server(s) 104 also includes the image differential system 102 as part of a digital content editing system 106. For example, in one or more implementations, the digital content editing system 106 is able to store, generate, modify, edit, enhance, provide, distribute, and/or share digital content, such as digital images and image differential metrics. For example, the digital content editing system 106 provides tools for the client devices 108a-108n, via the client applications 110a-110n, to generate and modify digital images.

In one or more embodiments, the server(s) 104 includes all, or a portion of, the image differential system 102. For example, the image differential system 102 operates on the server(s) to generate and provide image differential metrics in response to image editing requests. In some cases, the image differential system 102 utilizes, locally on the server(s) 104 or from another network location (e.g., the database 112), an image modification neural network to generate modified digital image from which to determine image differential metrics. In addition, the image differential system 102 includes or communicates with an interactive image editing architecture 103 made up of one or more containers or components. For instance, the image differential system 102 utilizes a container orchestration engine such as Kubernetes to facilitate or orchestration operation of various containerized software actors within the interactive image editing architecture 103, such as a canvas worker container, a set of graphical processors, and a backend editing controller.

In certain cases, the client devices 108a-108n includes all or part of the image differential system 102. For example, the client devices 108a-108n generates, obtains (e.g., downloads), or utilizes one or more aspects of the image differential system 102 from the server(s) 104. Indeed, in some implementations, as illustrated in FIG. 1, the image differential system 102 is located in whole or in part on the client devices 108a-108n. For example, the image differential system 102 includes a web hosting application that allows the client devices 108a-108n to interact with the server(s) 104. To illustrate, in one or more implementations, the client devices 108a-108n accesses a web page supported and/or hosted by the server(s) 104.

In one or more embodiments, the client devices 108a-108n and the server(s) 104 work together to implement the image differential system 102. For example, in some embodiments, the server(s) 104 train one or more neural networks discussed herein and provide the one or more neural networks to the client devices 108a-108n for implementation. In some embodiments, the server(s) 104 train one or more neural networks, the client devices 108a-108n request image edits, the server(s) 104 generate modified digital images and corresponding image differential metrics utilizing the one or more neural networks and provide the image differential metrics to the client devices 108a-108n. Furthermore, in some implementations, the client devices 108a-108n assist in training one or more neural networks.

Although FIG. 1 illustrates a particular arrangement of the environment, in some embodiments, the environment has a different arrangement of components and/or may have a different number or set of components altogether. For instance, as mentioned, the image differential system 102 is implemented by (e.g., located entirely or in part on) the client devices 108a-108n. In addition, in one or more embodiments, the client devices 108a-108n communicates directly with the image differential system 102, bypassing the network 114. Further, in some embodiments, the interactive image editing architecture 103 includes one or more components stored in the database 112, maintained by the server(s) 104, the client devices 108a-108n, or a third-party device.

Figure 2:
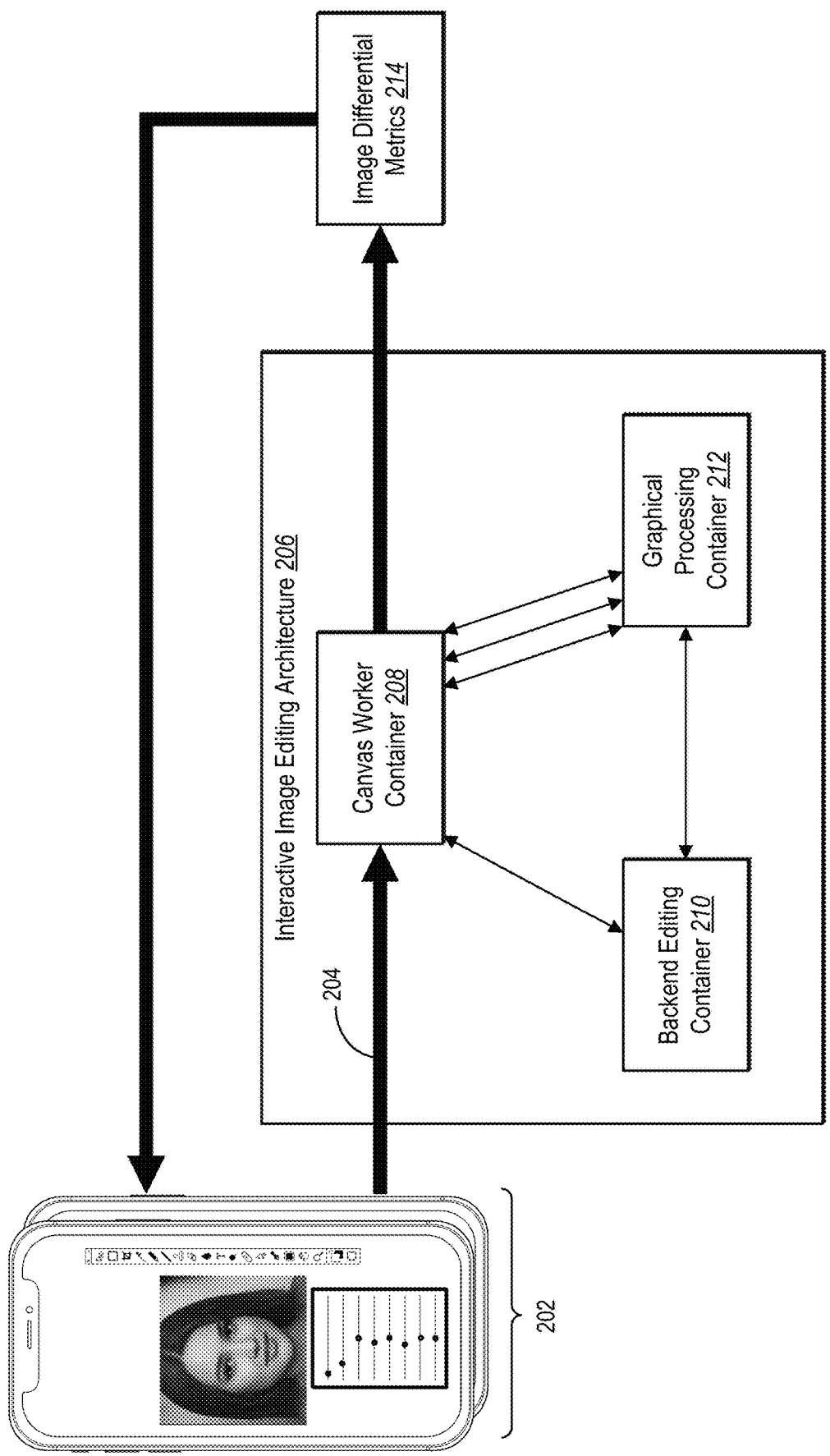
FIG. 2 illustrates an overview of generating modified digital images for many image editing requests utilizing an interactive image editing architecture in accordance with one or more embodiments.

As mentioned, in one or more embodiments, the image differential system 102 receives image editing requests from many client devices (e.g., the client devices 108a-108n) and generates image differential metrics based on the requests. In particular, the image differential system 102 utilizes an interactive image editing architecture to generate image differential metrics for respective image editing requests for rending modified digital images. FIG. 2 illustrates an overview of receiving image editing requests and utilizing an interactive image editing architecture to generate image differential metrics in accordance with one or more embodiments. Additional detail regarding the various acts and architectural components described in relation to FIG. 2 is provided thereafter with reference to subsequent figures.

As illustrated in FIG. 2, the image differential system 102 receives image editing requests 204 from client devices 202 (e.g., one or more of the client devices 108a-108n). For example, the image differential system 102 receives an image editing request in the form of an indication of a user interaction (via a client device) to edit or modify a digital image. In some cases, an image editing request includes a user interaction to modify one or more GAN-based features or attributes using a slider, a timeline, an image grid, a collage, or a sketch tool. In one or more embodiments, the image differential system 102 receives image editing requests in the form of the user interactions described in U.S. patent application Ser. No. 17/182,492 (Akhilesh Kumar et al.), which is incorporated herein by reference in its entirety.

For instance, a GAN-based operation refers to a digital image editing operation that utilizes one or more GANs to perform the requested modification. In particular, a GAN-based operation includes an operation to perform a GAN-based modification to edit or change one or more GAN-based image features of a digital image. Example GAN-based image features include, but are not limited to, a measure of happiness, a measure of surprise, a measure of age, a measure of anger, and a measure of baldness. Indeed, GAN-based image features are generally more complex and computationally intensive than more conventional digital image modifications, such as changing colors, cropping, and adjusting brightness.

As shown, the image differential system 102 receives a large number of image editing requests 204 from the client devices 202 (as indicated by the thicker arrows). To accommodate such large numbers (or high frequencies) of image editing requests 204, the image differential system 102 utilizes an interactive image editing architecture 206 (e.g., the interactive image editing architecture 103) to process the image editing requests 204. Indeed, the image differential system 102 utilizes the interactive image editing architecture 206 to facilitate remotely (e.g., at a server rather than locally at a client device) generating fast, interactive image modifications.

For example, the image differential system 102 utilizes a container orchestration engine to implement the interactive image editing architecture 206. In some cases, a container orchestration engine includes a software engine or platform for automating deployment, scaling, and management of containerized software services and applications. For example, a container orchestration engine can include a software application having a microservice architecture that executes individual workflow containers as part of a digital image modification. The container orchestration engine can treat each container separately for performing discrete functionalities (e.g., containerized tasks) that can be compartmentalized and added or removed from workflows in a piecewise fashion, while each container is communicatively coupled together.

In some embodiments, the interactive image editing architecture 206 includes one or more workflow containers for performing a workflow such as modifying a digital image for an image editing request. For instance, a workflow container (or sometimes simply "container") includes a unit of software that packages code (and all its dependencies) for portable deployment. For example, a workflow container includes a compartmentalized or containerized, manipulable, moveable, and executable body of code that performs a particular function or task. In some cases, a workflow container is executable to perform a function or task (e.g., a process or thread) to, for instance, generate a particular output from a piece of data (e.g., an image differential metric from an image editing request). The image differential system 102 sometimes treats workflow containers separately, isolating some containers differently than others to permit and/or prevent access to data in a specific and tailored fashion (e.g., within one or more workflow data sources). In some cases, a container refers to a KUBERNETES container. Example containers include a canvas worker container 208, a backend editing container 210, and/or a graphical processing container 212.

In some cases, the image differential system 102 utilizes one or more containers in groups or pods. For instance, the term pod can refer to a deployable unit of software within a container orchestration engine that includes a group of one or more workflow containers. In some cases, a pod is the smallest deployable unit or denomination of software that a container orchestration engine can execute. Within a pod, the constituent containers can share a common network and/or common computing resources such as storage locations and processing devices.

As part of the interactive image editing architecture 206, the image differential system implements the canvas worker container 208 to receive the image editing requests 204 (e.g., at a rate of hundreds or thousands per second). In addition, the image differential system 102 utilizes the canvas worker container 208 to throttle the image editing requests 204 to prevent overloading or to prevent otherwise inefficiently utilizing resources of the graphical processing container 212 in generating modified digital images. To elaborate, as indicated by the triple arrow, the image differential system 102 provides or sends the graphical processing container 212 a subset of the image editing requests 204 (e.g., according to a graphical processing capacity of one or more graphical processors).

Additionally, the image differential system 102 utilizes the graphical processing container 212 to modify digital images for the provided image editing requests. More specifically, the image differential system 102 utilizes the graphical processing container 212 to implement graphical processors and/or image modification neural networks to generate a modified digital image. For instance, the graphical processing container 212 generates a modified digital image according to a user interaction of an image editing request and provides the modified digital image back to the canvas worker container 208 (and does so for each image editing request sent to the graphical processing container 212).

Further, the image differential system 102 utilizes the canvas worker container 208 to generate image differential metrics 214 from the modified digital images. For example, the image differential system 102 generates an image differential metric that includes a metric or an indication of a difference between a previous digital image and a subsequent or modified version of a digital image (e.g., after a modification). Indeed, in some cases, an image differential metric indicates a change, or delta, between a previously rendered digital image and a modified digital image to be rendered. For instance, an image differential metric includes a compressed image frame that includes data from a prior, unmodified version of a digital image as well modified data for a modified version of the digital image. In some embodiments, an image differential metric includes instructions or computer code (interpretable by a browser or another client application) to cause a client device to update a digital video feed by modifying a current digital image (or a current frame) with a modified version (of the current frame) by implementing a change included within the image differential metric. In some cases, an image differential metric indicates or reflects prior image data (e.g., image data that has already been transmitted) to inform the generation of subsequent image frames. For example, an image differential metric indicates a change of a latent image vector in one vector direction or another to thereby adjust a particular GAN-based image feature or attribute.

As just suggested, to generate an image differential metric, the image differential system 102 compares an initial (e.g., unmodified) version of a digital image with a modified version of the digital image to determine an image differential metric describing or representing the difference. To facilitate comparing different versions of digital images, the image differential system 102 utilizes the canvas worker container 208 (or multiple canvas worker containers) to maintain digital streams that reflect versions (e.g., unmodified versions and/or modified versions) of digital images as displayed on the client devices 202.

For example, the image differential system 102 maintains a digital stream that includes a continuous or consecutive transmission and/or reception of one or more data objects (e.g., data packets) from one computing device to another computing device. In some cases, the image differential system provides a digital stream to a client device to keep digital images displayed on the client device up to date in real time relative to user interactions requesting modifications. For example, a digital stream can include data for one or more digital images of a digital video feed. A digital stream can also, or alternatively, include an image differential metric that indicates changes to a digital image or a digital video feed.

Thus, the image differential system 102 compares a first version of a digital image with a second version of a digital image (e.g., within a digital stream) to generate an image differential metric. The image differential system 102 further provides the image differential metrics 214 to the client devices 202 to cause the client devices 202 to render modified versions of the digital images (thereby reflecting the modifications requested via the user interaction). Indeed, the image differential system 102 provides the image differential metrics 214 without needing to provide entire digital images, thereby saving computational resources that would otherwise be required to transmit many thousands of digital images (which can be very large for high definition images) across the client devices 202, while still causing the client devices 202 to display the modifications to the respective images (in real time or near real time with user interactions for performing image edits).

In certain embodiments, the image differential system 102 generates the image differential metric to reflect prior information or prior image data. For instance, the image differential system 102 determines prior image data from one or more frames or images previously transmitted to a client device (e.g., from among the client devices 202). The image differential system 102 further accounts for the prior image data, like statistics or probabilities indicating pixels from previous frames containing certain tones or colors, when generating subsequent image frames (e.g., using the image differential metric) such that the entropy in a newly generated frame is lower than if the prior image data were not used. Indeed, the image differential system 102 uses the prior image frames to build a more efficient encoding representation for future frames. Thus, the image differential system 102 can generate and provide delta frames or key frames based on image differential metrics that account for or reflect prior image data.

As an example, in certain embodiments the image differential system 102 utilizes a machine learning model trained to generate a specialized video encoding scheme. For instance, the image differential system 102 utilizes a machine-learning-based encoder that does not necessarily require explicit delta frame representations. Instead, the machine learning encoder utilizes one or more of: sample video frames used for training, or specific digital images (e.g., video frames) already transmitted during a particular editing session (or some other prior image data from frames already transmitted). Based on these data, the machine learning encoder generates a predicted subsequent frame (or set of subsequent frames) for a digital video.

In one or more embodiments, the image differential system 102 further utilizes the backend editing container 210 to facilitate image modifications. For example, in response to a user interaction for an image editing request, the image differential system 102 utilizes the backend editing container 210 to generate a modified latent image vector representing or reflecting a modified digital image for the modification. In some cases, a latent image vector includes a vector of hidden or latent features that represent or indicate image features and/or unobservable attributes of a digital image. For example, a latent image vector includes a numerical encoding or representation of a digital image. In some embodiments, a latent image vector includes one or more vector directions. In some cases, a latent image vector can have vector directions that encode or indicate particular image features. For example, one vector direction corresponds to age while another vector direction corresponds to happiness of a face depicted within a digital image. Thus, modifying the latent image vector in either of the directions results in corresponding modifications to the neural-network-based image features (e.g., GAN-based image features) depicted by the digital image.

In certain embodiments, the image differential system 102 provides the modified latent image vector to the graphical processing container 212. In turn, the graphical processing container 212 generates a modified digital image from the modified latent image vector. For instance, the image differential system 102 utilizes the graphical processing container 212 to input the modified latent image vector into an image modification neural network to generate a modified digital image. For example, the image modification neural network includes a neural network that extracts latent image vectors from digital images and/or generates digital images from latent image vectors. In particular, an image modification neural network extracts latent or hidden features from a digital image and encodes the features into a latent feature vector. In some cases, an image modification neural network generates or reconstructs a digital image from a latent image vector. In one or more embodiments, an image modification neural network takes the form of a generative adversarial neural network. For example, in some embodiments, the image modification neural network is the iGAN described by Jun-Yan Zhu, Philipp Krähenbühl, Eli Shechtman, and Alexei A. Efros in *Generative Visual Manipulation on the Natural Image Manifold*, European Conference on Computer Vision 597-613 (2016), which is incorporated herein by reference in its entirety. In other embodiments, the image modification neural network is a StyleGAN, StyleGAN2, RealnessGAN, ProGAN, or any other suitable generative neural network. In certain cases, the image modification neural network is a neural network other than a generative neural network, and takes the form of, for example, a PixelRNN or a PixelCNN.

Along these lines, in some embodiments, a generative adversarial neural network (or "GAN") includes a neural network that is tuned or trained via an adversarial process to generate an output digital image from an input digital image. In some cases, a generative adversarial neural network includes multiple constituent neural networks such as an encoder neural network and a generator neural network. For example, an encoder neural network extracts latent code from a digital image. A generator neural network generates a modified digital image by combining extracted latent code (e.g., from the encoder neural network). A discriminator neural network, in competition with the generator neural network, analyzes a generated digital image from the generator neural network to determine whether the generated digital image is real (e.g., from a set of stored digital images) or fake (e.g., not from the set of stored digital images). The discriminator neural network also causes the image differential system 102 to modify parameters of the encoder neural network and/or the generator neural network to eventually generate digital images that fool the discriminator neural network into indicating that a generated digital image is a real digital image.

As illustrated in FIG. 2, and as mentioned above, the image differential system 102 further passes the modified digital image to the canvas worker container 208 for generating an image differential metric (e.g., by comparing versions in a digital stream) which then passes the image different metric to a client device (from among the client devices 202).

Figure 3:
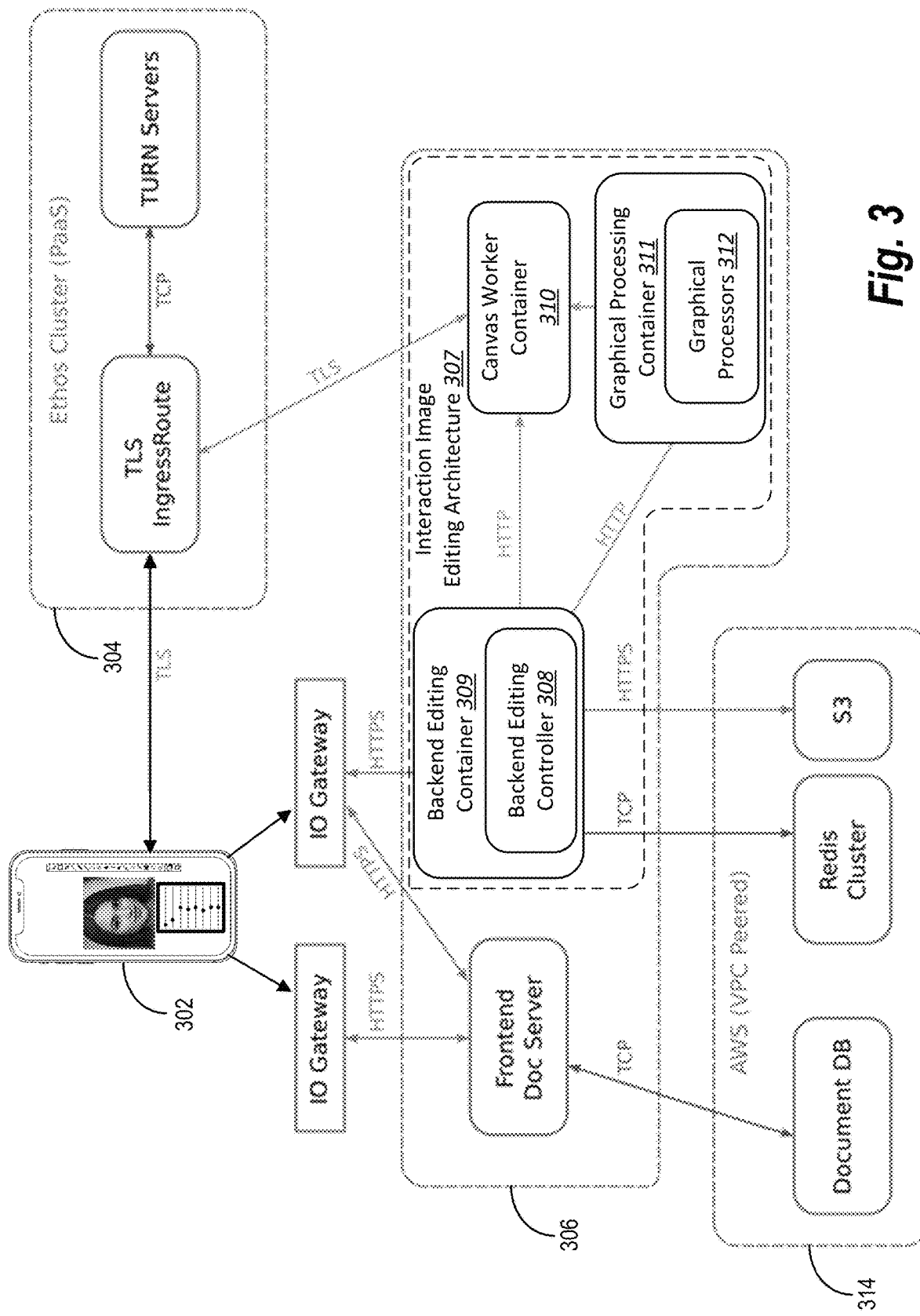
FIG. 3 illustrates an example containerized architecture for the interactive image editing architecture in accordance with one or more embodiments.

As mentioned above, in certain described embodiments, the image differential system 102 utilizes an interactive image editing architecture to remotely generate modified digital images. Part of the innovation behind the image differential system 102 is that many image edits can be applied to digital images in real time with processing latencies in the neighborhood of 100 ms or less. Achieving such low latencies results from reducing both the costs of communication between client devices and the interactive image editing architecture cluster, in addition to reducing the costs of intra-cluster (or intra-container) data transfers (e.g., east-west cluster communication). For example, the image differential system 102 utilizes an interactive image editing architecture that includes a canvas worker container, a backend editing container, and a graphical processing container. In some cases, an interactive image editing architecture is part of a larger containerized orchestrated architecture that includes additional containers or components. FIG. 3 illustrates an example containerized orchestrated architecture that includes an interactive image editing architecture for remotely modifying digital images in accordance with one or more embodiments.

As illustrated in FIG. 3, the image differential system 102 utilizes a containerized architecture of components or containers that are distributed or located across different servers (e.g., the server(s) 104). In addition, the image differential system 102 utilizes various communication protocols to pass data or information between the various distributed components to perform remote interactive image modifications. As shown, the containerized orchestrated architecture includes an ADOBE ETHOS cluster 304, an ADOBE ETHOS SENSEI Cluster 306 (or some other type of ETHOS cluster), and a number of components associated with, or located on, a third party web service 314 such as AMAZON WEB SERVICES ("AWS"). In certain cases, the image differential system 102 utilizes ADOBE ETHOS clusters for building scalable cloud services while customizing communication of the clusters to utilize Web Real-Time Communication protocol ("WebRTC") for interactive image editing.

As a main point of contact for the client device 302, the image differential system 102 utilizes the backend editing controller 308 (e.g., as part of a backend editing container 309). In some embodiments, the backend editing controller 308 provides a hypertext transfer protocol ("HTTP") representational state transfer ("REST") application programming interface ("API"). In response to an image editing request (as received via an IO Gateway) that requires use of graphical processors 312, the image differential system 102 utilizes the backend editing controller 308 to invoke an intra-cluster communication protocol such as HTTP, hypertext transfer protocol secure ("HTTPS"), GOOGLE remote procedure call ("GRPC"), or some other high-speed protocol. In some cases, the image differential system 102 utilizes an intra-cluster communication protocol that is very fast for communicating among the containers of the interactive image editing architecture 307 to facilitate interactive image editing.

To establish a digital stream shared or mirrored between the client device 302 and interactive image editing architecture 307, the image differential system 102 assigns a canvas worker container 310 to the client device 302 (or to an application session of a user account operating via the client device 302) and facilitates interactive connectivity establishment ("ICE") negotiation between them for a WebRTC connection.

As illustrated, the image differential system 102 utilizes one or more IO gateways to facilitate communication between the client device 302 and various containerized services. The image differential system 102 utilizes the IO gateway to intercept HTTPS communication between the client device 302 and the containerized services. Specifically, utilizing the IO Gateway allows the image differential system 102 to offload responsibility for several security tasks. For example, the IO gateway allows the image differential system 102 to configure throttling rules that can be used to protect against denial of service ("DOS") attacks or other abuses of service endpoints. The IO gateway also checks user account tokens to alleviate a relatively expensive per-device validation check. Instead, the image differential system 102 verifies that the image editing request originates from the IO gateway.

As shown, the image differential system 102 utilizes the ADOBE ETHOS cluster 304 to receive an image editing request from the client device 302. For example, the image differential system 102 utilizes a communication protocol for transmission of image editing requests (or data indicating modifications to digital images or corresponding latent image vectors) and corresponding image differential metrics, such as transport layer security ("TLS"). In some cases, the image differential system 102 utilizes a communication protocol capable of maintaining a constant digital stream between a canvas worker container 310 and the client device 302 to reflect modifications to a digital image in an interactive, real time fashion as a user performs edits on the client device 302 (and as the edits are implemented remotely).

As mentioned above, the image differential system 102 utilizes the canvas worker container 310 to manage image editing requests. For instance, the image differential system 102 utilizes the canvas worker container 310 to manage large numbers of instances of image editing data received via the TLS IngressRoute of the ETHOS cluster 304. Every time the canvas worker container 310 receives a data channel message (e.g., editing data for an image editing request), the canvas worker container 310 (or the image differential system 102) pushes the editing data to a queue. In some embodiments, the image differential system 102 generates many iterations of the canvas worker container 310 to handle respective client devices, where each canvas worker container 310 processes its data own queue. If image editing data is received that effectively overwrites waiting image editing data that has not yet been processed, the outdated data is discarded from the queue.

By utilizing such image editing data queueing, in some embodiments, the image differential system 102 processes one instance of image editing data at a time. In many cases, the image differential system 102 processes image editing data in the same order that they are received to prevent corruption or loss of data while preserving consistency and limiting resource demands that any single client device can place on the image differential system 102.

To process image editing data for an image editing request when it is popped from the queue, the canvas worker container 310 makes an HTTP request to the backend editing controller 308. In some cases, the image differential system 102 utilizes a DNS host lookup to resolve the internet protocol ("IP") address of the backend editing controller 308 (or the backend editing container 309) via a Kubernetes service. Accordingly, the image differential system 102 utilizes a single canvas worker container 310 to distribute its HTTP requests over all available backend editing controllers (e.g., via fast intra-cluster or intra-container communication). In certain cases, the backend editing controller 308 does not expose specific ports (e.g., port 6060) to the TO gateway, and the endpoint used for forwarding image editing data is therefore not included in the TO gateway setup. Thus, in some embodiments, the image differential system 102 ensures that image editing requests (and corresponding image data) are coming from a trusted source, namely, the canvas worker container 310. Because of this high level of trust, the image differential system 102 is able to skip certain internet protocol multimedia subsystem ("IMS") validations and process the image editing request immediately.

Most typically, the image differential system 102 sends image editing data (e.g., indications of slider adjustments made via the client device 302 to perform a GAN-based operation) to generate a new latent image vector, which further implies a new digital. Indeed, the image differential system 102 utilizes the backend editing controller 308 to generate a (modified) latent image vector according to image editing data for an image editing request. Additionally, the image differential system 102 utilizes the set of graphical processors 312 (as orchestrated by the graphical processing container 311) to convert the (modified) latent image vector into a modified digital image (modified in relation to a prior version displayed on the client device 302 before edits were performed). In certain cases, the image differential system 102 applies adaptive request throttling and/or frame dropping in the graphical processing container 311 (or other components in the architecture). Indeed, the image differential system 102 utilizes a priority-based frame dropping technique within the graphical processing container 311. For instance, the image differential system 102 implements a priority queue to apply selective frame dropping by the graphical processors 312 to run at a higher average load without sacrificing significant user experience costs.

In some embodiments, when the backend editing controller 308 calls the set of graphical processors 312 and provides a latent image vector to the set of graphical processors 312, the backend editing controller 308 does not expect the set of graphical processors 312 to return the modified digital image. Instead, the backend editing controller 308 provides the set of graphical processors 312 with a list of IP addresses for one or instances of the canvas worker container 310 as destinations for the modified digital image (as forwarded by the graphical processing container 311 or the set of graphical processors 312). By far the most computationally expensive part of the interactive image editing architecture 307 is the communication that moves raw image data (e.g., a modified digital image) from the graphical processing container 311 (or the set of graphical processors 312) to canvas worker container 310. The image differential system 102 greatly reduces latency with its design by utilizing intra-cluster (or intra-container) network communication and only requiring a single transmission of the raw image data.

In certain embodiments, the canvas worker container 310 generates one or more digital streams shared with client devices (e.g., the client device 302), and places digital images into those as specified by other microservice containers such as the backend editing container 309 (or the backend editing controller 308) or the graphical processing container 311 (operating the set of graphical processors 312). In some cases, modified digital images generated from image editing requests are similar to previous unmodified images that the client device 302 has already rendered and displayed. This means that the image differential system 102 provides high quality image data to the client device 302 by sending image differential metrics (e.g., compressed delta frames over a VP9 video stream), rather than complete image buffers for each image update. The image differential system 102 decreases latency and network load dramatically by utilizing image differential metrics in this way.

In some embodiments, the canvas worker container 310 exposes an HTTP API to the other two intra-cluster containers of the interactive image editing architecture 307, such as the backend editing controller 308 and the set of graphical processors 312. Because all HTTP communication with the canvas worker is between clusters of the shared architecture, the image differential system 102 requires no authentication layer is required for this API.

In some cases, the canvas worker container 310 has only two endpoints. The first endpoint is an upload endpoint. The upload endpoint receives URL query string parameters specifying a session identification of the client device 302 along with the width and height of the digital image being edited. In some cases, the body of the image editing request contains image data in raw byte form. In other cases, the query string specifies the format of the digital image (if none is specified, rgb24 is assumed). If the upload is successful, the image differential system 102 generates a unicode transformation format 8 ("UTF-8") encoded local IP address of the canvas worker container 310 that processed the image editing request. If the canvas worker container 310 has seen the session identification referenced in a prior upload call, the canvas worker container 310 updates the digital image served by its respective digital stream. However, if the session identification is new, the canvas worker container 310 allocates data structures and worker threads needed to serve a new persistent digital stream.

The second endpoint in the canvas worker container 310 is an API call. This endpoint takes a query string that includes a session identification and a body that includes an ICE connection offer (e.g., including the session description protocol ("SDP") for the client device 302). The response from the API call is an SDP that the client device 302 uses to complete the connection to the canvas worker container 310 (e.g., for maintaining a digital stream therebetween).

In some cases, the image differential system 102 utilizes ICE protocol to relay data through TLS connections using TURNS (note the trailing 'S') protocol. The TURNS protocol adds TLS handshaking and message encryption to the existing TCP TURN protocol. Using TURNS, the image differential system 102 runs a TURN server on the ETHOS cluster 304 and connects both the client device 302 and the canvas worker container 310 to that TURN server using TLS (e.g., over port 443). Accordingly, the image differential system 102 utilizes the TURN server to serve raw TCP sockets, thereby offloading responsibility for TLS handshaking and encryption to the IngressRoute Kubernetes component and communicating in unencrypted TCP between the IngressRoute and TURN server. By doing so, the image differential system 102 maintains and rotates SSL certificates for the TLS connections via the ETHOS team, and that complexity can be ignored by the TURN server itself. In some cases, the image differential system 102 allocates a new digital stream from the canvas worker container 310 and completes the ICE negotiation inside the course of single HTTPS call to the backend editing controller 308.

After receiving the SDP from the client device 302 and the corresponding session identification from the backend editing controller 308, the canvas worker container 310 waits for its TURN channel allocation request to complete before sending its own SDP to the backend editing controller 308. This is an atypical behavior in a modern WebRTC peer. In a conventional ICE negotiation process, a worker container would return its SDP immediately, then send a second message to a client device patching the original SDP once the TURN channel was setup. However, in some cases, the disclosed image differential system 102 does not form the WebRTC connection without the help of the TURN server, and therefore, the image differential system 102 waits for the TURN channel allocation to complete before returning the SDP. Waiting before returning means the image differential system 102 does not need to patch the SDP, thereby circumventing the problem of routing additional messages between the canvas worker container 310 and the client device 302 before the ICE connection has been fully set up. In some cases, the client device 302 must wait for its own channel allocation call to the TURN server to complete before sending its SDP to the backend editing controller 308, which the image differential system 102 achieves by adding custom promise/future handling code to the WebRTC code of the client device 302.

By using this waiting logic, the image differential system 102 performs the entire ICE negotiation process in a single HTTPS call between the client device 302 to the backend editing controller 308. During the course of that single call, the backend editing controller 308 identifies the exact IP address of the canvas worker container 310 that allocated the digital stream for the provided image, along with the session identification corresponding to image editing request. Additionally, the image differential system 102 stores the IP address and the secession identification in Redis to maintain a persistent connection. Thus, for any further calls received by the backend editing controller 308 that reference the same session identification, the image differential system 102 checks Redis to determine the IP address of the canvas worker container 310 that serves the corresponding digital stream.

In the case of a pod eviction event (either for the TURN pod or the canvas worker container 310), the image differential system 102 expands the session IP info stored in Redis to include a second canvas worker container to continue forwarding frame updates (e.g., image differential metrics) to both a retiring canvas worker container (e.g., the canvas worker container 310) and its replacement while the digital stream is being setup.

As further illustrated in FIG. 3, the image differential system 102 utilizes a frontend doc server within the ETHOS Sensei Cluster 306. In some embodiments, the frontend doc server is part of an overall frontend that includes two components: a react webpage and the frontend doc server used to store session info. The frontend doc server communicates with the backend editing controller 308 via HTTPS calls to a publicly accessible IO gateway endpoint. In some cases, both the frontend doc server and the backend editing controller 308 are hosted on the same cluster (e.g., the ETHOS Sensei Cluster 306), and the image differential system 102 therefore routes communications from one to the other directly using intra-cluster communication.

In one or more embodiments, the image differential system 102 utilizes virtual private cloud ("VPC") peering connection to connect the frontend doc server to the third party web service 314, including the AWS Document DB. The image differential system 102 further utilizes the same VPC peering connection to connect the backend editing controller 308 to the AWS Redis cluster and S3 stores.

As mentioned, in one or more embodiments, the image differential system 102 utilizes intra-cluster or intra-container communication (sometimes referred to as east-west routing or east-west communication). To perform intra-cluster communication, the image differential system 102 assigns containers running in Kubernetes a local IP address used to communicate with that container directly. In some cases, the image differential system 102 does not use IP addresses directly. Instead, the image differential system 102 requests a connection to a service component for containers that wish to communicate with other Kubernetes containers. On receiving such a request, the image differential system 102 utilizes the service component to select the IP address of a healthy container, distributing the load over all available containers.

In certain embodiments, the first time the backend editing controller 308 makes a call to the upload endpoint of the canvas worker container 310 (e.g., with a new session identification), the image differential system 102 connects the backend editing controller 308 to a random (implicitly load balanced) canvas worker container 310. However, when making later calls to the canvas worker container 310, the image differential system 102 users the direct container IP stored in Redis for the backend editing controller 308. For creating east-west ingress and egress rules to facilitate two CaaS deployments, the image differential system 102 generates a network policy linking them. Importantly, this policy allows unrestricted network egress to both the service component associated with the canvas worker container 310, as well as to all canvas worker container IPs.

Figure 4:
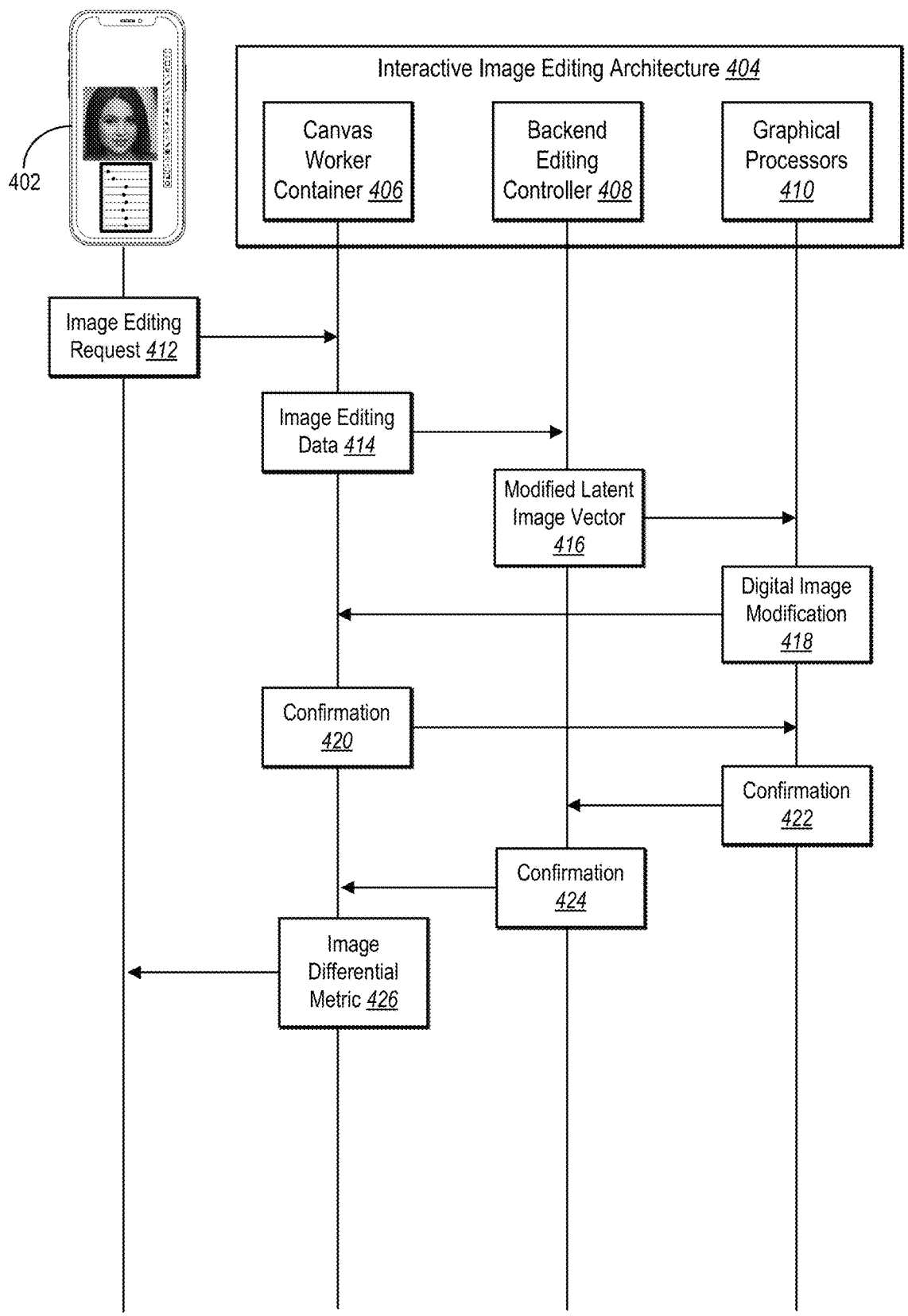
FIG. 4 illustrates a sequence diagram of acts performed by various components of an interactive image editing architecture as part of generating a modified digital image in accordance with one or more embodiments.

As mentioned above, in certain described embodiments, the image differential system 102 facilitates remote digital image editing at interactive speeds. Indeed, the image differential system 102 utilizes components of an interactive image editing architecture to perform various acts as part of the digital image editing. FIG. 4 illustrates a sequence diagram of acts performed by a client device and by respective components of an interactive image editing architecture in accordance with one or more embodiments.

As illustrated in FIG. 4, the client device 302 provides an image editing request 412 to the interactive image editing architecture 404. For example, the client device 302 receives a user interaction to edit or modify a digital image via a GAN-based operation. In some cases, the client device 302 receives a user interaction to move a slider to adjust a GAN-base image feature (or a user interaction to adjust a GAN-based feature in another way as described in U.S. patent application Ser. No. 17/182,492 cited above). The client device 302 further provides the image editing request 412 to the interactive image editing architecture 404 to perform the modification indicated by the user interaction.

In response to receiving the image editing request 412, the image differential system 102 utilizes the canvas worker container 406 (e.g., the canvas worker container 310) to generate or update a digital stream to include image editing data 414. Specifically, the canvas worker container 406 determines image editing data 414 (e.g., information indication GAN-based operations such as changes to sliders) associated with the image editing request 412 and provides the image editing data 414 to the backend editing controller 408 (e.g., the backend editing controller 308). In some cases, the canvas worker container 406 maintains a digital stream that reflects versions of the digital image as displayed on the client device 402 and updates the digital stream to include the image editing data 414.

As further illustrated in FIG. 4, the backend editing controller 408 receives the image editing data 414 and generates a modified latent image vector 416 from the image editing data. To elaborate, the backend editing controller 408 generates the modified latent image vector 416 to represent or reflect (in vector form) the digital image within the digital stream (and displayed on the client device 402) along with the image editing data 414. In some cases, the backend editing controller 408 modifies a preexisting latent image vector that represents an unmodified version of the digital image to generate the modified latent image vector 416 for representing modifications to be made to the digital image. The backend editing controller 408 further provides the modified latent image vector 416 to the set graphical processors 410 (e.g., the set of graphical processors 312).

Additionally, the set of graphical processors 410 generates a digital image modification 418 from the modified latent image vector 416. For example, the set of graphical processors 410 generates the digital image modification 418 in the form of a modified digital image. In some cases, the set of graphical processors 410 utilizes a machine learning model such as an image modification neural network to generate the digital image modification 418 (e.g., a modified digital image) from the modified latent image vector 416. The set of graphical processors 410 further provides the digital image modification 418 to the canvas worker container 406.

In response, the canvas worker container 406 provides a confirmation 420 (e.g., an HTTP 200 success message) to the set of graphical processors 410. In turn, the set of graphical processors 410 provides a confirmation 422 (e.g., the same as the confirmation 420) to the backend editing controller 408. Additionally, the backend editing controller 408 provides a confirmation 424 (or forwards the same confirmation 420) to the canvas worker container 406. In some cases, the image differential system 102 does not start processing a thread from the canvas worker container 406 until the confirmation 424 associated with the image editing request 412 is received.

As further shown, the canvas worker container 406 further generates an image differential metric 426 in response to receiving the confirmation 424 (or based on receiving the digital image modification 418). For instance, the canvas worker container 406 generates or determines an image differential metric 426 by comparing a prior version of the digital image displayed on the client device 402 before an image edit and the modified digital image (or the digital image modification 418) generated by the set of graphical processors 410. In addition, the canvas worker container 406 provides the image differential metric 426 to the client device 402 (e.g., as part of the digital stream) to cause the client device 402 to update the rendering of the digital image to depict a modification represented by the image differential metric 426.

Figure 5:
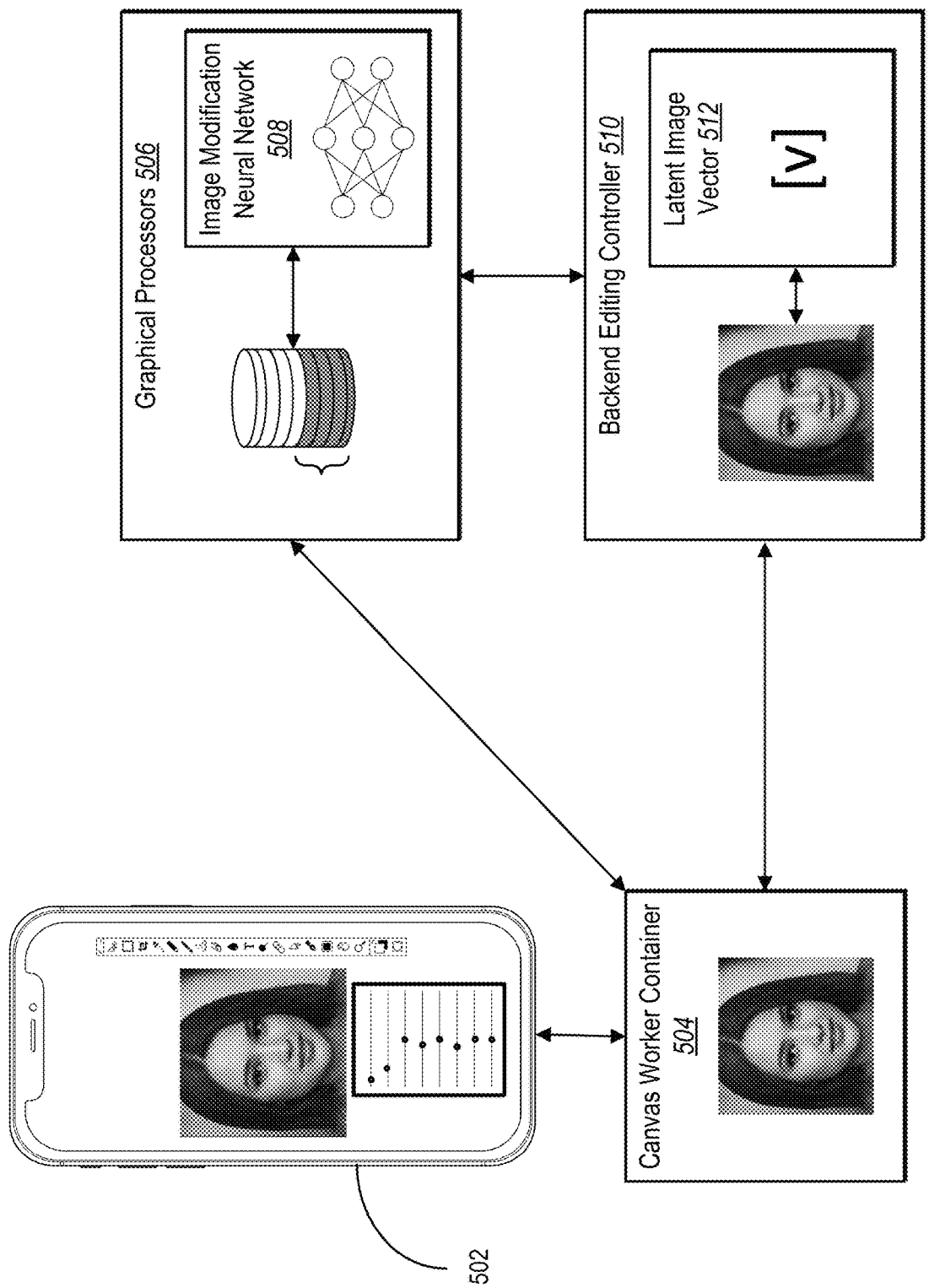
FIG. 5 illustrates an example of utilizing graphical processors to generate modified digital images according to a graphical processing capacity in accordance with one or more embodiments.

As mentioned above, in certain described embodiments, the image differential system 102 utilizes a canvas worker container to throttle large numbers of image editing requests. In particular, the image differential system 102 utilizes a canvas worker container to manage image editing requests and to assign the requests to graphical processors according to a graphical processing capacity (e.g., for more efficient, faster image modifications). FIG. 5 illustrates an example diagram for utilizing components of the interactive image editing architecture to manage image editing requests according to a graphical processing capacity of a set of graphical processors in accordance with one or more embodiments.

As illustrated in FIG. 5, the image differential system 102 receives an image editing request from a client device 502 including slider information (or other information from interface elements) for GAN-based operations. In addition, the image differential system 102 utilizes a canvas worker container 504 (e.g., the canvas worker container 406) to assign the image editing request to the set of graphical processors 506. For instance, the canvas worker container 504 assigns or provides image editing requests to the set of graphical processors 506 on a per-cycle basis.

Specifically, because the set of graphical processors 506 cannot keep up with generating modified digital images one at a time as they are received, and because the set of graphical processors 506 have multiple threads for generating multiple modified digital images on a given editing cycle, the canvas worker container 504 provides groups or subsets of received image editing requests to the set of graphical processors 506 for each editing cycle. In some cases, the canvas worker container 504 provides a first subset of image editing requests for the set of graphical processors 506 to process on a first editing cycle (e.g., to generate a first subset of modified digital images). In addition, the canvas worker container 504 provides a second subset of image editing requests for the set of graphical processors 506 to process on a second editing cycle (e.g., to generate a second subset modified digital images). Indeed, the set of graphical processors 506 (and/or other components of the architecture) can apply rate limiting logic using techniques, such as backpressure and/or reactive streams.

For example, the canvas worker container 504 determines a graphical processing capacity of the set of graphical processors 506 based on a number of processing threads or other capabilities of the set of graphical processors (which indicates a number of modified digital images that the set of graphical processors 506 can generate on a given cycle). Based on the graphical processing capacity of the set of graphical processors 506, the canvas worker container 504 assigns the image editing request from the client device 502 (along with a subset of other received image editing requests from other client devices) to the set of graphical processors. As shown, the graphical processing capacity of the set of graphical processors 506 is not filled (as represented by the dark fill line on the segmented cylinder), so the canvas worker container 504 can assign additional image editing requests.

In some cases, the image differential system 102 utilizes the canvas worker container 504 to collect or spool image editing requests as they are rapidly received from many different client devices. The image differential system 102 then provides the image editing requests to the set of graphical processors 506 in per-cycle groups (filling the processing capacity for each cycle) to keep up with received image editing requests. In some embodiments, the graphical processors 506 utilize the image modification neural network 508 to generate modified digital images. For instance, the graphical processors 506 utilize many instances of the image modification neural network 508 for different threads of the graphical processors 506 to (simultaneously) generate different modified digital images for different image editing requests (for different client devices).

As shown, the image differential system 102 further utilizes the backend editing controller 510 (e.g., the backend editing controller 308) to generate a latent image vector 512 based on a received image editing request. In particular, the backend editing controller 510 generates or modifies a latent image vector 512 to represent or define a GAN-based modification made to a digital image. The image differential system 102 further utilizes the backend editing controller 510 (or multiple backend editing controllers) to generate modified latent vectors for multiple image editing requests from multiple client devices. As described, the backend editing controller 510 further provides the modified latent image vectors to the set of graphical processors 506 for generating modified digital images corresponding to image editing requests.

Figure 6:
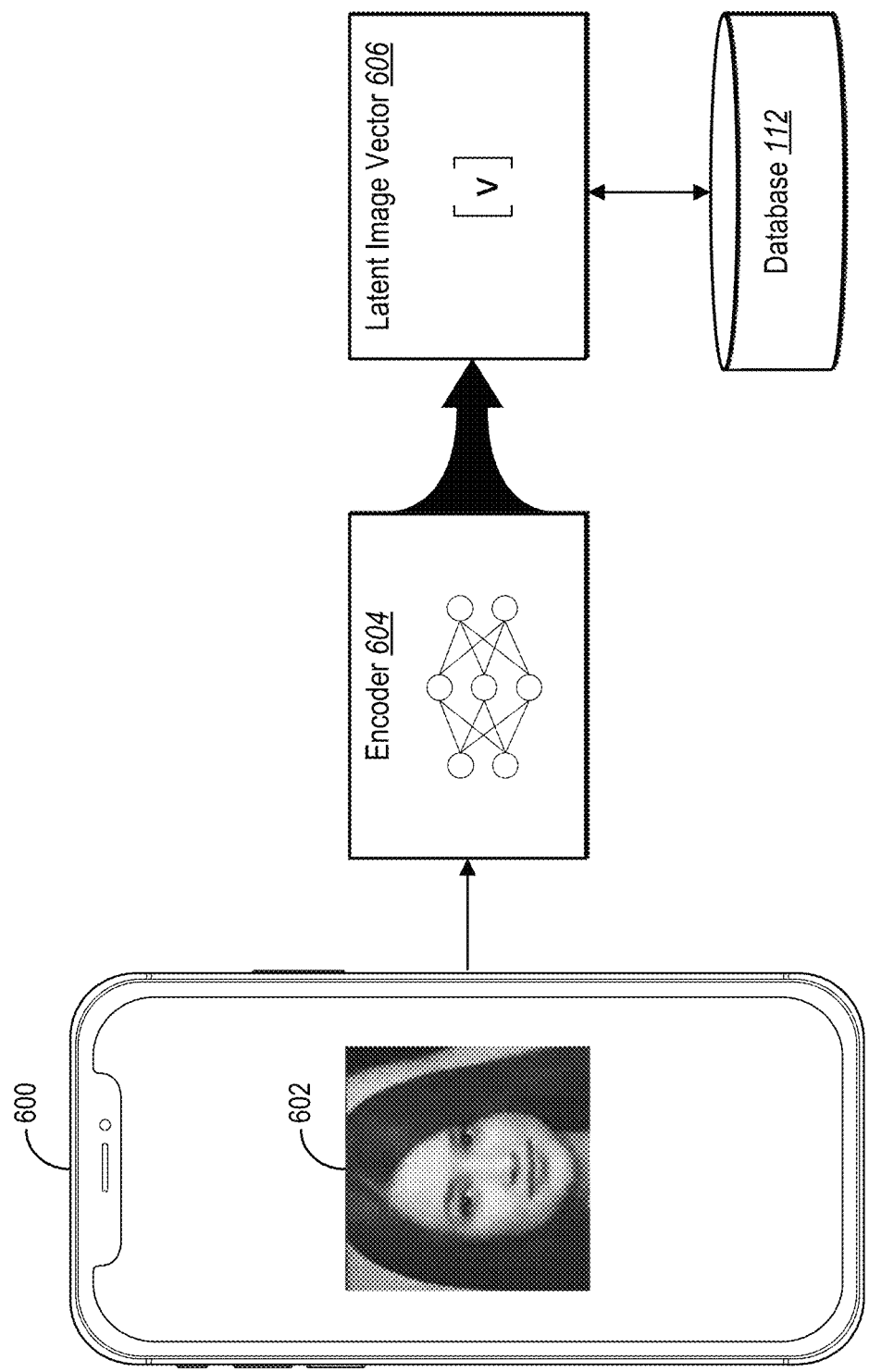
FIG. 6 illustrates an example of generating a latent image vector from a digital image in accordance with one or more embodiments.

As mentioned above, in certain described embodiments, the image differential system 102 generates a latent image vector for a digital image. In particular, the image differential system 102 utilizes a backend editing controller to generate latent image vectors (e.g., initial latent image vectors for unmodified digital images and modified latent image vectors for modified digital images). FIG. 6 illustrates generating a latent image vector in accordance with one or more embodiments.

As illustrated in FIG. 6, the image differential system 102 identifies an initial digital image 602. In particular, the image differential system 102 receives the initial digital image 602 (or an indication of the initial digital image 602) from the client device 600. For instance, the client device 600 captures the initial digital image 602 and uploads the initial digital image 602 for access by the image differential system 102. As another example, the client device 600 provides an indication of a user selection of the initial digital image 602, whereupon the image differential system 102 accesses the initial digital image 602 from a repository of digital images (e.g., stored within the database 112).

As further illustrated in FIG. 6, the image differential system 102 utilizes an encoder 604 (e.g., as a prior layer to or part of an image modification neural network) to analyze the initial digital image 602. More specifically, the image differential system 102 utilizes the encoder 604 to process the initial digital image 602 to extract features to include within a latent image vector 606. Indeed, the image differential system 102 generates the latent image vector 606 from the initial digital image 602. Thus, the latent image vector 606 includes features that represent visible and/or unobservable hidden features of the digital image 602. In one or more embodiments, the image differential system 102 further stores the latent image vector 606 in the database 112.

Figure 7:
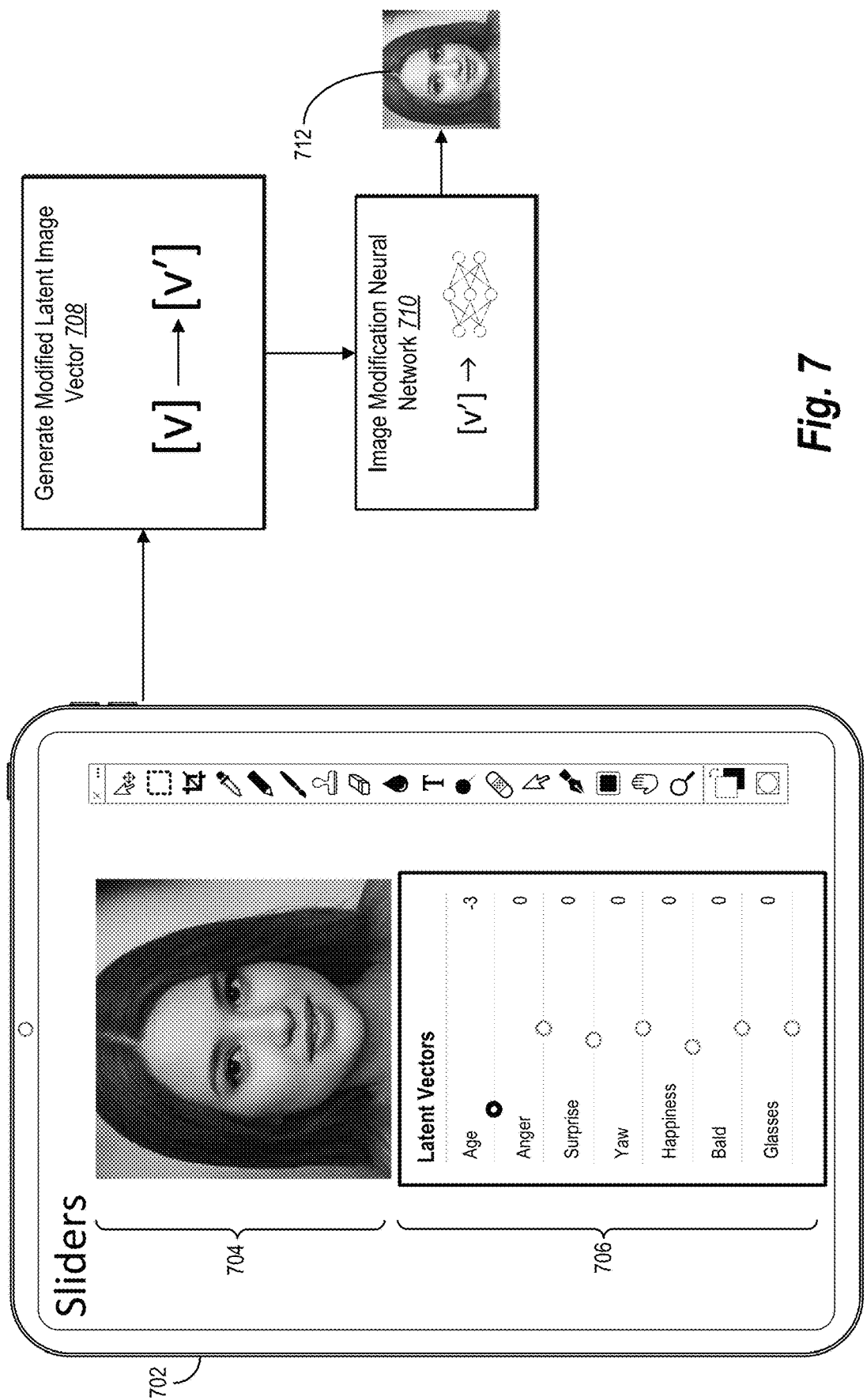
FIG. 7 illustrates an example of generating a modified digital image from a modified latent image vector in accordance with one or more embodiments.

As mentioned, in some embodiments, the image differential system 102 generates a modified digital image from a modified latent image vector. In particular, the image differential system 102 generates a modified latent image vector based on a user interaction to modify a digital image, and the image differential system 102 further generates a modified digital image from the modified latent image vector. FIG. 7 illustrates an example process for generating a modified digital image from a modified latent image vector in accordance with one or more embodiments.

As illustrated in FIG. 7, the image differential system 102 receives an indication of a user interaction to modify an initial digital image 704. For instance, FIG. 7 illustrates a user interaction to modify the initial digital image 704 utilizing sliders 706 corresponding to GAN-based image features. For instance, in response to a user interaction to move the age slider from a first value to a second value, the image differential system 102 generates a modified digital image 712 that reflects the modified age. As shown, the modified digital image depicts a slightly older face with gray hairs and aged features.

Indeed, upon receiving an indication of a user interaction to modify the digital image 704, the image differential system 102 performs an act 708 to generate a modified latent image vector. Specifically, the image differential system 102 modifies the latent image vector according to the user interaction. In some cases, the image differential system 102 modifies the latent image vector by changing a magnitude of a vector along a vector direction corresponding to the GAN-based image feature (e.g., age). For instance, the image differential system 102 receives a sequence of user interactions (or a sequence of image editing requests) for making a series of modifications for different movements of slider elements. In turn, the image differential system 102 generates a sequence of modified digital images reflecting respective modifications corresponding to the sequence of user interactions (e.g., one modified image per interaction). Specifically, the image differential system 102 determines a sequence of image differential metrics for the sequence of image editing requests (e.g., from the modified digital images) and provides the image differential metrics to the client device 702 to remain concurrent with edits to the digital image 704 for each interaction.

While FIG. 7 illustrates a particular user interaction to modify the initial digital image 704 by adjusting a slider, the image differential system 102 can implement additional or alternative user interactions. Indeed, as suggested above, in some embodiments, the image differential system 102 receives indications of user interactions via slider elements or other user interface elements to modify particular image features (e.g., GAN-based image features). Modifying a measure of happiness is one example of a GAN-based image feature that the image differential system 102 can modify based on user interaction with a slider element. In some cases, the image differential system 102 determines a vector direction corresponding to the image feature adjusted via the user interaction and modifies features of the latent image vector associated with the vector direction in a measure corresponding to a measure of adjustment indicated by the user interaction.

In one or more embodiments, the image differential system 102 receives an indication of a user interaction with an interactive timeline to modify multiple neural-network-based image features at once. For example, the image differential system 102 receives an indication that a user adjusts a slidable bar over multiple slider elements at once, where each slider element corresponds to a different GAN-based image feature. Thus, the image differential system 102 generates the modified latent image vector by multiplying, or adding to, or subtracting from, the vector directions of the latent image vector that correspond to the adjustments to the GAN-based image features requested via the user interaction.

In certain embodiments, the image differential system 102 receives an indication of a user interaction with a collage tool for selecting features from one or more additional digital images to combine with the initial digital image 704. For example, the image differential system 102 receives a selection of a nose from an additional digital image to combine with facial features of the initial digital image 704. In response to the user interaction with the collage tool, the image differential system 102 generates the modified latent image vector by combining one or more portions an additional latent image vector (e.g., the portion(s) corresponding to the nose or other selected area) from the additional digital image with the latent image vector of the initial digital image.

In one or more embodiments, the image differential system 102 receives an indication of a user interaction with a sketch tool of an image modification interface. In particular, the image differential system 102 receives an indication of one or more strokes made via the sketch tool to add to or otherwise alter the initial digital image with a digital applicator. For example, the image differential system 102 determines that the user interaction includes strokes to add glasses around the eyes depicted within the initial digital image 704. In response, the image differential system 102 generates a modified digital image vector. For instance, the image differential system 102 searches the database 112 to identify a digital image depicted glasses (e.g., glasses within a threshold similarity of those added via the strokes of the sketch tool). In addition, the image differential system 102 combines the features of the additional digital image (e.g., a portion of the features corresponding to the glasses) with features of the initial latent image vector.

As further illustrated in FIG. 7, in addition to generating the modified latent image vector, the image differential system 102 performs generates a modified digital image 712 utilizing the image modification neural network 710. In particular, the image differential system 102 utilizes the image modification neural network 710 to generate the modified digital image 712 from the modified latent image vector. For example, the image differential system 102 generates the modified digital image 712 that resembles or depicts the modifications requested via the user interaction.

Figure 8:
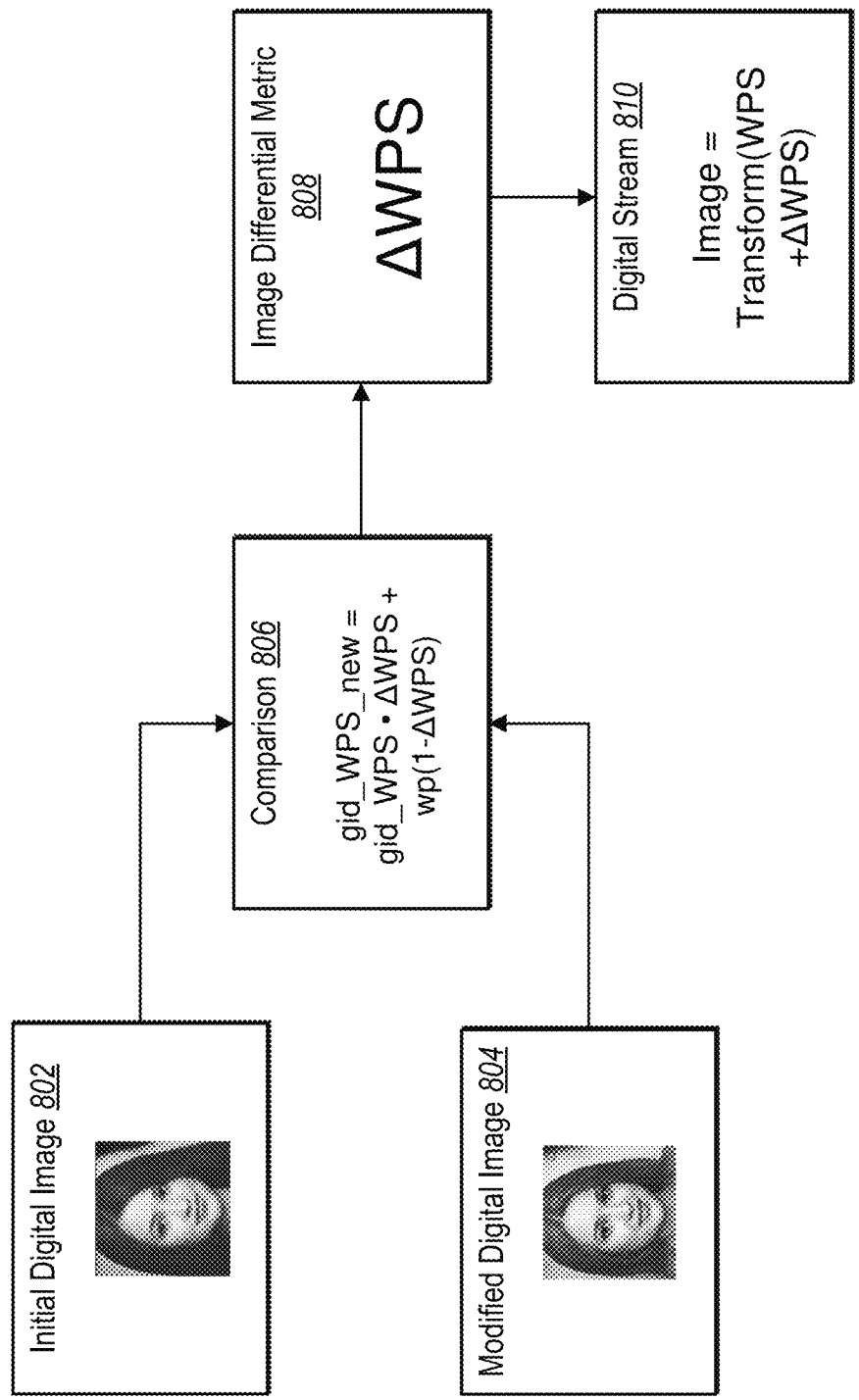
FIG. 8 illustrates an example of modifying a digital stream to include an image differential metric in accordance with one or more embodiments.

As mentioned above, in certain embodiments, the image differential system 102 further causes a client device to render and display a modified digital image. In particular, the image differential system 102 determines an image differential metric based on a modified digital image and provides the image differential metric to a client device to cause the client device to render the changes to the digital image (e.g., as part of a digital stream). FIG. 8 illustrates generating an image differential metric and including the image differential metric as part of a digital stream in accordance with one or more embodiments.

As illustrated in FIG. 8, the image differential system 102 performs a comparison 806 between an initial digital image 802 and a modified digital image 804. As described above, the image differential system 102 identifies the initial digital image 802 as a digital image received or indicated by a client device. In addition, the image differential system 102 generates the modified digital image 804 from the initial digital image 802 utilizing a set of graphical processors (and an image modification neural network), as also described above.

In addition, the image differential system 102 performs the comparison 806 to determine a difference between the initial digital image 802 and the modified digital image 804. More specifically, the image differential system 102 determines a visible and/or unobservable difference in the pixels and/or a difference in instructions between displaying the initial digital image 802 and the modified digital image 804. In some cases, the image differential system 102 determines the difference by comparing the initial latent image vector with the modified latent image vector (e.g., by subtracting the initial image vector from the modified image vector or vice-versa). As shown, the image differential system 102 performs the comparison 806 by comparing the initial digital image 802 with the modified digital image 804 in accordance with the following function:

$$gid\_WPS\_new = gid\_WPS * \Delta WPS + WP(1 - \Delta WPS)$$

where gid_WPS_new represents an array of latent image vectors corresponding to the modified digital image 804, gid_WPS represents an array of latent image vectors corresponding to the initial digital image 802, WP represents the initial digital image 802, and $\Delta WPS$ represents an image differential metric 808.

Indeed, as a result of the comparison 806, the image differential system 102 generates the image differential metric 808. In particular, the image differential system 102 generates the image differential metric 808 that indicates or reflects the difference between the initial digital image 802 and the modified digital image 804. As shown, the image differential system 102 further includes the image differential metric 808 within a digital stream 810.

More specifically, the image differential system 102 modifies the digital stream 810 provided to a client device (e.g., as a stream of digital images and/or other data for presenting and editing a digital video feed) by including the image differential metric 808. As illustrated, the image differential system 102 provides the image differential metric 808 as part of the digital stream 810 to cause the client device to present the transformation of the initial digital image 802 to the modified digital image 804. For example, in some embodiments, the image differential system 102 causes the client device to render the modified digital image 804 in accordance with the following function:

$$Image = Tranform(WPS) - Images\_stream = Transform(WPS + \Delta WPS)$$

where Image represents the modified digital image 804, Images_stream represents the digital stream 810 provided to the client device for presenting digital images (e.g., as part of digital video feeds), and Trans form(.) represents a GAN-based operation. In some cases, Trans form(.) is performed by an embodiment of the image modification neural network by, for example, combining features with those of additional digital images and/or adjusting features to increase/decrease measures of happiness or other GAN-based image features. The image differential system 102 thereby transforms the array of latent image vectors WPS as modified by the image-differential metric $\Delta WPS$.

As mentioned, in one or more embodiments, the image differential system 102 provides the initial digital image 802 and the modified digital image 804 as part of a digital video feed or other digital data stream. For instance, the image differential system 102 provides a digital video feed as part of a digital stream. In certain embodiments, each latent image vector in an array of latent image vectors corresponds to an individual frame of the digital stream. Thus, the image differential system 102 provides the initial digital image 802 as a set of frames of a digital video feed where each frame depicts the same initial digital image 802. To update the digital video feed with the modified digital image 804, the image differential system 102 modifies the set of frames of the digital video feed via a set of graphical processors (and an image modification neural network), as described above. In addition, the image differential system 102 generates and provides the image differential metric 808 to the client device as part of the digital stream 810 to cause the client device to update the digital video feed to present the modified digital image 804.

Figure 9:
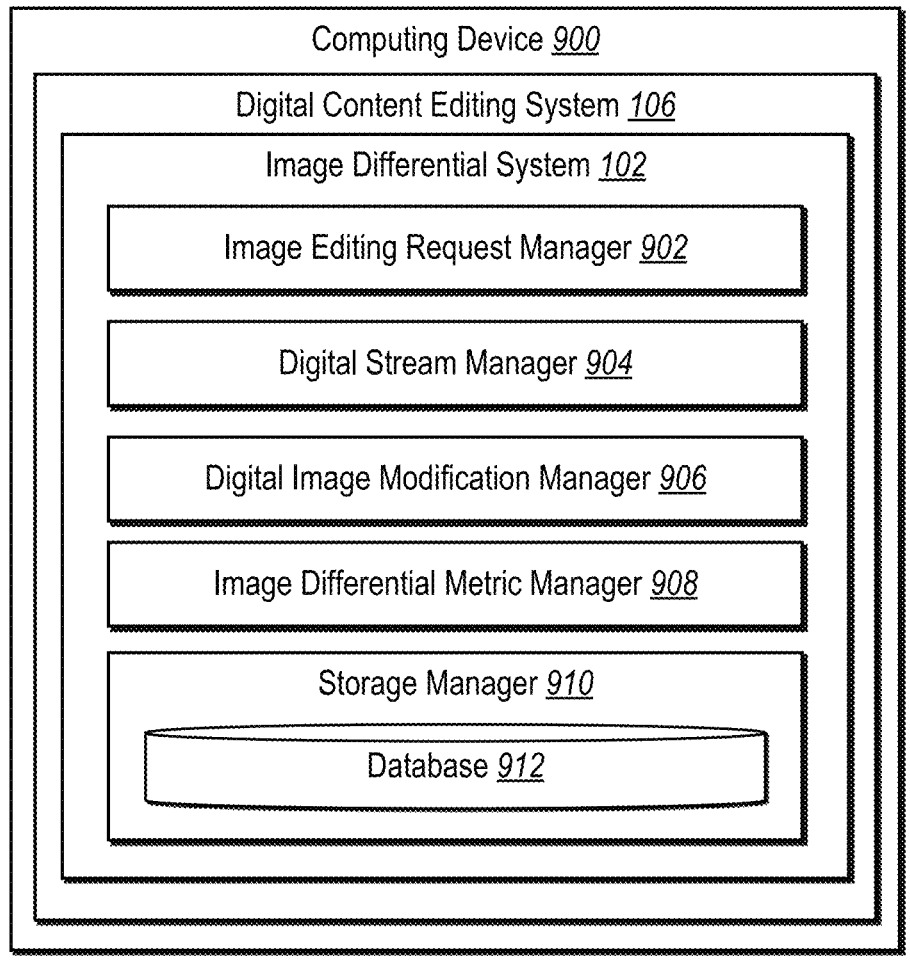
FIG. 9 illustrates a schematic diagram of an image differential system in accordance with one or more embodiments.

Looking now to FIG. 9, additional detail will be provided regarding components and capabilities of the image differential system 102. Specifically, FIG. 9 illustrates an example schematic diagram of the image differential system 102 on an example computing device 900 (e.g., one or more of the client devices 108a-108n and/or the server(s) 104). As shown in FIG. 9, the image differential system 102 includes an image editing request manager 902, a digital stream manager 904, a digital image modification manager 906, an image differential metric manager 908 and a storage manager 910.

As just mentioned, the image differential system 102 includes an image editing request manager 902. In particular, the image editing request manager 902 manages, maintains, receives, detects, determines, identifies, analyzes, or processes image editing requests. For example, the image editing request manager 902 receives image editing requests from client devices and utilizes one or more components of an interactive image editing architecture to process the image editing requests to assign them to graphical processors and generate latent image vectors reflecting edits of the image editing requests.

As shown, the image differential system 102 includes a digital stream manager 904. In particular, the digital stream manager 904 manages, maintains, generates, provides, synchronizes, facilitates, modifies, updates, or streams digital streams. For example, the digital stream manager 904 maintains a digital stream between a client device and a canvas worker container to remain up to date and reflect image modifications made in response to user edits within an editing interface. The digital stream manager 904 further modifies the digital stream to include image differential metrics to provide to client devices to cause the client devices to render updates to digital images.

In addition, the image differential system 102 includes a digital image modification manager 906. In particular, the digital image modification manager 906 manages, determines, generates, or identifies digital image modifications or modified digital images. For example, the digital image modification manager 906 generates modified digital images from modified latent image vectors (e.g., utilizing image modification neural networks) utilizes graphical processors, as described herein. Indeed, the digital image modification manager 906 generates modified digital images to reflect edits made via client devices.

Further, the image differential system 102 includes an image differential metric manager 908. For example, the image differential metric manager 908 determines, manages, generates, or identifies image differential metrics that represent differences, deltas, or discrepancies between versions of a digital image. In some cases, the image differential metric manager 908 utilizes a canvas worker container to determine an image differential metric indicating a different between a prior version of a digital image within a digital stream and a modified version of the digital image. The image differential metric manager 908 provides image differential metrics to client devices to cause the client devices to render the modified digital images.

The image differential system 102 further includes a storage manager 910. The storage manager 910 operates in conjunction with, or includes, one or more memory devices such as the database 912 (e.g., the database 112) that stores various data such as digital images, image differential metrics, or image modification neural networks.

In one or more embodiments, each of the components of the image differential system 102 are in communication with one another using any suitable communication technologies. Additionally, the components of the image differential system 102 is in communication with one or more other devices including one or more client devices described above. It will be recognized that although the components of the image differential system 102 are shown to be separate in FIG. 9, any of the subcomponents may be combined into fewer components, such as into a single component, or divided into more components as may serve a particular implementation. Furthermore, although the components of FIG. 9 are described in connection with the image differential system 102, at least some of the components for performing operations in conjunction with the image differential system 102 described herein may be implemented on other devices within the environment.

The components of the image differential system 102 include software, hardware, or both. For example, the components of the image differential system 102 include one or more instructions stored on a computer-readable storage medium and executable by processors of one or more computing devices (e.g., the computing device 900). When executed by the one or more processors, the computer-executable instructions of the image differential system 102 cause the computing device 900 to perform the methods described herein. Alternatively, the components of the image differential system 102 comprise hardware, such as a special purpose processing device to perform a certain function or group of functions. Additionally, or alternatively, the components of the image differential system 102 include a combination of computer-executable instructions and hardware.

Furthermore, the components of the image differential system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the image differential system 102 may be implemented as part of a stand-alone application on a personal computing device or a mobile device. Alternatively, or additionally, the components of the image differential system 102 may be implemented in any application that allows creation and delivery of content to users, including, but not limited to, applications in ADOBE® EXPERIENCE MANAGER and CREATIVE CLOUD®, such as PHOTOSHOP®, LIGHTROOM®, and INDESIGN®. "ADOBE," "ADOBE EXPERIENCE MANAGER," "CREATIVE CLOUD," "PHOTOSHOP," "LIGHTROOM," and "INDESIGN" are either registered trademarks or trademarks of Adobe Inc. in the United States and/or other countries.

FIGS. 1-9 the corresponding text, and the examples provide a number of different systems, methods, and non-transitory computer readable media for remotely generating modified digital images utilizing an interactive image architecture. In addition to the foregoing, embodiments can also be described in terms of flowcharts comprising acts for accomplishing a particular result. For example, FIG. 10 illustrates a flowchart of an example sequences or series of acts in accordance with one or more embodiments.

While FIG. 10 illustrates acts according to particular embodiments, alternative embodiments may omit, add to, reorder, and/or modify any of the acts shown in FIG. 10. The acts of FIG. 10 can be performed as part of a method. Alternatively, a non-transitory computer readable medium can comprise instructions, that when executed by one or more processors, cause a computing device to perform the acts of FIG. 10. In still further embodiments, a system can perform the acts of FIG. 10. Additionally, the acts described herein may be repeated or performed in parallel with one another or in parallel with different instances of the same or other similar acts.

FIG. 10 illustrates an example series of acts 1000 for remotely generating modified digital images utilizing an interactive image architecture. In particular, the series of acts 1000 includes an act 1002 of receiving an indication for remotely editing a digital image utilizing an interactive image editing architecture. For example, the act 1002 involves receiving an indication of a user interaction from a client device for remotely editing a digital image utilizing an interactive image editing architecture comprising a canvas worker container. In some cases, the series of acts 1000 includes an act of receiving a plurality of image editing requests from a plurality of client devices for remotely editing respective digital images displayed on the plurality of client devices utilizing the interactive image editing architecture.

The series of acts 1000 also includes an act of throttling, via the canvas worker container, image editing data for the plurality of image editing requests according to a graphical processing capacity of the interactive image editing architecture for performing modifications based on the plurality of image editing requests utilizing the canvas worker container. In some cases, the interactive image editing architecture further includes a set of graphical processors and a backend editing controller communicatively coupled to the canvas worker container such that the interactive image editing architecture facilitates extemporaneous remote digital image editing for a plurality of client devices. In certain embodiments, the interactive image editing architecture includes a container orchestration engine that coordinates execution of the canvas worker container, a graphical processing container corresponding to the set of graphical processors, and a backend editing container corresponding to the backend editing controller.

In one or more embodiments, the series of acts 1000 includes an act of receiving indications of a sequence of user interactions from the client device for moving slider elements corresponding to image attributes for progressively editing the digital image. The series of acts 1000 also includes an act of generating, utilizing the set of graphical processors, a sequence of digital images reflecting respective modifications corresponding to the sequence of user interactions. In certain cases, the series of acts 1000 includes an act of determining, utilizing the canvas worker container, a sequence of image differential metrics corresponding to the sequence of digital images reflecting the respective modifications. In addition, the series of acts 1000 includes an act of providing to the client device, for each user interaction within the sequence of user interactions, a corresponding image differential metric from the sequence of image differential metrics for updating the digital image to reflect a corresponding modification.

As shown, the series of acts 1000 also includes an act 1004 of generating a modification to the digital image according to the indication. In particular, the act 1004 involves generating, according to the user interaction, a modification to the digital image utilizing the set of graphical processors as instructed by the backend editing controller. For example, the act 1004 involves applying an image modification neural network utilizing the set of graphical processors. In some cases, the act 1004 involves utilizing the canvas worker container to generate modification batches to fill a graphical processing capacity of the set of graphical processors for modifying digital images.

As further illustrated in FIG. 10, the series of acts 1000 includes an act 1006 of determining an image differential metric. In particular, the act 1006 involves determining, from the digital stream utilizing the canvas worker container, an image differential metric indicating a difference between a first version of the digital image and a second version of the digital image associated with the indication for remotely editing the digital image. In some embodiments, the series of acts 1000 includes an act of generating a latent image vector representing the digital image and an act of generating a modified latent image vector indicating a modification according to the user interaction for remotely editing the digital image. In some cases, the act 1006 involves comparing an initial digital image corresponding to the latent image vector and a modified digital image corresponding to the modified latent image vector. In one or more embodiments, the act 1006 involves generating a compressed image frame by combining image data from a first frame reflecting the first version of the digital image with image data from a second frame reflecting the second version of the digital image.

In some cases, the act 1006 includes an additional act 1008 of maintaining a digital stream that reflects versions of the digital image. In particular, the act 1008 involves maintaining, via the canvas worker container, a digital stream that reflects versions of the digital image as displayed by the client device according to modifications to the digital image. In some cases, the act 1008 involves updating the digital stream to reflect the modification according to the image differential metric.

Additionally, the act 1006 includes an act 1010 of comparing a first version of the digital image and a second version of the digital image. In particular, the act 1010 involves comparing, from a digital stream that reflects versions of the digital image and utilizing the canvas worker container, a first version of the digital image that is unmodified and a second version of the digital image reflecting the modification. In some embodiments, the act 1010 involves utilizing the canvas worker container to compare the first version of the digital image reflected in a first transmission of the digital stream and the second version of the digital image reflected in a second transmission of the digital stream. For instance, the act 1010 involves comparing, from a digital stream that reflects versions of the digital image and utilizing the canvas worker container, a first version of the digital image that is unmodified and a second version of the digital image reflecting the modification. Thus, in some cases, determining an image differential metric indicates a modification according to comparing the first version and the second version utilizing the canvas worker container. In some embodiments, the act 1010 involves determining a difference between a first latent image vector associated with the first version and a second image latent vector associated with the second version.

Further, the series of acts 1000 includes an act 1012 of providing the image differential metric to a client device. In particular, the act 1012 involves providing the image differential metric to the client device for rendering the second version of the digital image to reflect a modification corresponding to the user interaction. For example, the act 1012 involves providing the digital stream to the client device for displaying the digital image over a plurality of frames.

In some embodiments, the series of acts 1000 includes an act of receiving additional indications from additional client devices for remotely editing additional digital images utilizing the interactive image editing architecture. In addition, the series of acts 1000 includes an act of assigning, for a first editing cycle of the set of graphical processors and utilizing the canvas worker container, a first subset of the additional digital images to the set of graphical processors for modifying the first subset of additional digital images. Further, the series of acts 1000 includes an act of assigning, for a second editing cycle of the set of graphical processors and utilizing the canvas worker container, a second subset of the additional digital images to the set of graphical processors for modifying the second subset of additional digital images. In some cases, the series of acts 1000 involves an act of determining a number of modifications to assign to the set of graphical processors for the first editing cycle according to a graphical processing capacity of the set of graphical processors.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
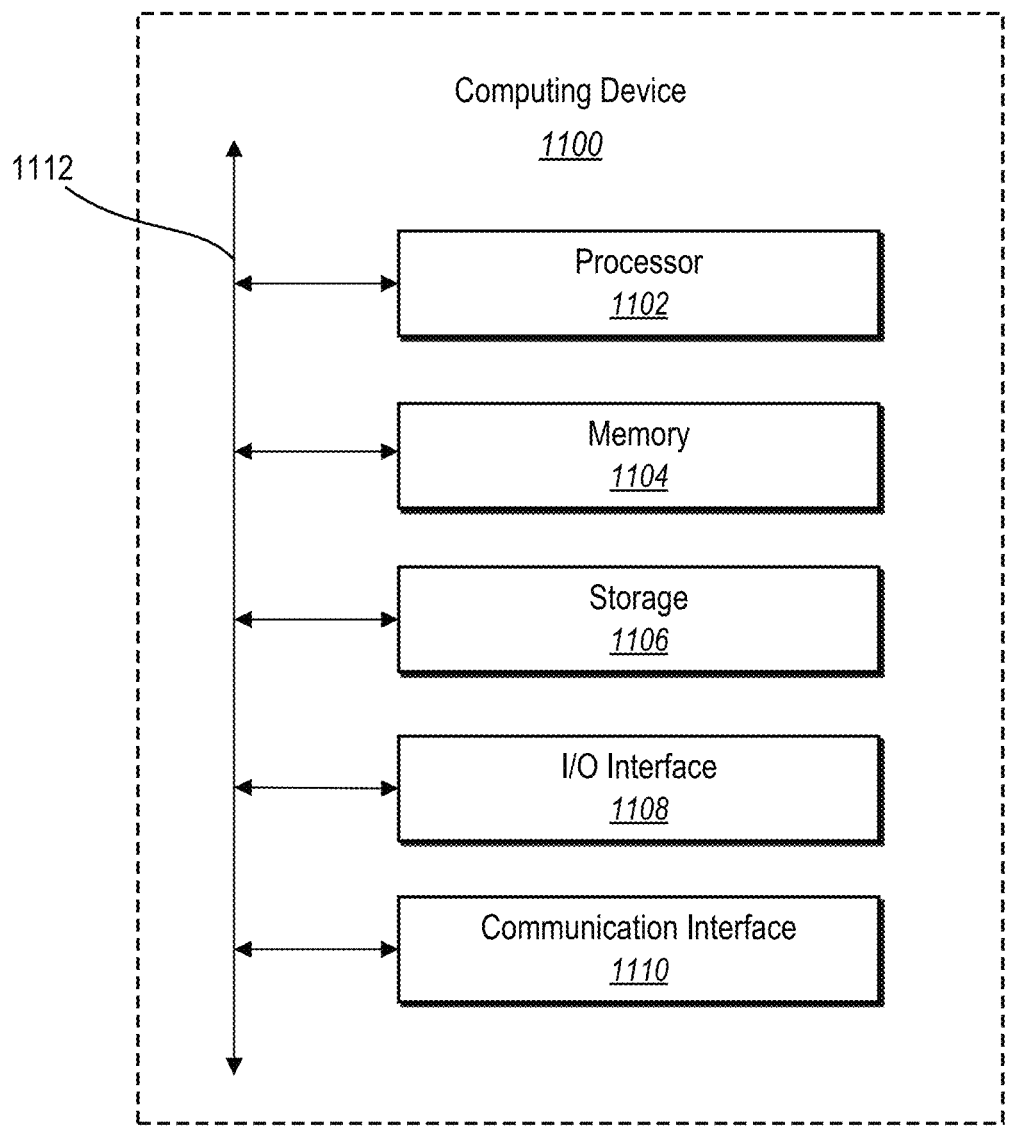
FIG. 11 illustrates a block diagram of an example computing device in accordance with one or more embodiments.

FIG. 11 illustrates, in block diagram form, an example computing device 1100 (e.g., the computing device 800, the client devices 108a-108n, and/or the server(s) 104) that may be configured to perform one or more of the processes described above. One will appreciate that the image differential system 102 can comprise implementations of the computing device 1100. As shown by FIG. 11, the computing device can comprise a processor 1102, memory 1104, a storage device 1106, an I/O interface 1108, and a communication interface 1110. Furthermore, the computing device 1100 can include an input device such as a touchscreen, mouse, keyboard, etc. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, storage device 1106 can comprise a non-transitory storage medium described above. The storage device 1106 may include a hard disk drive (HDD), flash memory, a Universal Serial Bus (USB) drive or a combination of these or other storage devices.

The computing device 1100 also includes one or more input or output ("I/O") devices/interfaces 1108, which are provided to allow a user to provide input to (such as user strokes), receive output from, and otherwise transfer data to and from the computing device 1100. These I/O devices/interfaces 1108 may include a mouse, keypad or a keyboard, a touch screen, camera, optical scanner, network interface, modem, other known I/O devices or a combination of such I/O devices/interfaces 1108. The touch screen may be activated with a writing device or a finger.

The I/O devices/interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1108 is configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices 1100 or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause the at least one processor to perform operations comprising:

receiving an indication of a user interaction from a client device for remotely editing a digital image utilizing an interactive image editing architecture comprising a canvas worker container;

maintaining, via the canvas worker container, a digital stream that reflects versions of the digital image as displayed by the client device according to modifications to the digital image;

determining, from the digital stream utilizing the canvas worker container, an image differential metric indicating prior image data from a first version of the digital image previously transmitted to the client device and a second version of the digital image associated with the indication for remotely editing the digital image; and providing the image differential metric to the client device for rendering the second version of the digital image to reflect a modification corresponding to the user interaction.

2. The non-transitory computer readable medium of claim 1, further comprising instructions that, when executed by the at least one processor, cause the at least one processor to perform operations comprising:

receiving a plurality of image editing requests from a plurality of client devices for remotely editing respective digital images displayed on the plurality of client devices utilizing the interactive image editing architecture; and throttling, via the canvas worker container, image editing data for the plurality of image editing requests according to a graphical processing capacity of the interactive image editing architecture for performing modifications based on the plurality of image editing requests utilizing the canvas worker container.

3. The non-transitory computer readable medium of claim 1, further comprising instructions that, when executed by the at least one processor, cause the at least one processor to perform operations comprising:

generating a latent image vector representing the digital image; and generating a modified latent image vector indicating a modification according to the user interaction for remotely editing the digital image.

4. The non-transitory computer readable medium of claim 3, wherein determining the image differential metric comprises comparing an initial digital image corresponding to the latent image vector and a modified digital image corresponding to the modified latent image vector.

5. The non-transitory computer readable medium of claim 1, wherein the interactive image editing architecture further comprises a set of graphical processors and a backend editing controller communicatively coupled to the canvas worker container such that the interactive image editing architecture facilitates extemporaneous remote digital image editing for a plurality of client devices.

6. The non-transitory computer readable medium of claim 1, further comprising instructions that, when executed by the at least one processor, cause the at least one processor to perform an operation comprising providing the digital stream to the client device for displaying the digital image over a plurality of frames; and wherein providing the image differential metric to the client device for rendering the second version of the digital image comprises updating the digital stream to reflect the modification according to the image differential metric.

7. The non-transitory computer readable medium of claim 1, wherein determining the image differential metric comprises generating a compressed image frame by combining image data from a first frame reflecting the first version of the digital image with image data from a second frame reflecting the second version of the digital image.

8. A system comprising:
one or more memory devices;
an interactive image editing architecture comprising a canvas worker container, a set of graphical processors, a backend editing controller; and
one or more processors configured to cause the system to:
receive an indication of a user interaction from a client device for remotely editing a digital image utilizing the interactive image editing architecture;
generate, according to the user interaction, a modification to the digital image utilizing the set of graphical processors as instructed by the backend editing controller;
determine, from the modification to the digital image utilizing the canvas worker container, an image differential metric indicating a difference between a first version of the digital image and a second version of the digital image associated with the modification; and
provide the image differential metric to the client device for rendering the second version of the digital image to reflect the modification.

9. The system of claim 8, wherein the one or more processors are further configured to cause the system to:
receive additional indications from additional client devices for remotely editing additional digital images utilizing the interactive image editing architecture;
assign, for a first editing cycle of the set of graphical processors and utilizing the canvas worker container, a first subset of the additional digital images to the set of graphical processors for modifying the first subset of additional digital images; and
assign, for a second editing cycle of the set of graphical processors and utilizing the canvas worker container, a second subset of the additional digital images to the set of graphical processors for modifying the second subset of additional digital images.

10. The system of claim 9, wherein the one or more processors are further configured to cause the system to determine a number of modifications to assign to the set of graphical processors for the first editing cycle according to a graphical processing capacity of the set of graphical processors.

11. The system of claim 8, wherein the one or more processors are further configured to cause the system to generate the modification to the digital image by applying an image modification neural network utilizing the set of graphical processors.

12. The system of claim 8, wherein the one or more processors are further configured to cause the system to:
receive indications of a sequence of user interactions from the client device for moving slider elements corresponding to image attributes for progressively editing the digital image; and
generate, utilizing the set of graphical processors, a sequence of digital images reflecting respective modifications corresponding to the sequence of user interactions.

13. The system of claim 12, wherein the one or more processors are further configured to cause the system to:
determine, utilizing the canvas worker container, a sequence of image differential metrics corresponding to the sequence of digital images reflecting the respective modifications; and
provide to the client device, for each user interaction within the sequence of user interactions, a corresponding image differential metric from the sequence of image differential metrics for updating the digital image to reflect a corresponding modification.

14. The system of claim 8, wherein the one or more processors are further configured to cause the system to:
maintain, utilizing the canvas worker container, a digital stream that reflects versions of the digital image as displayed on the client device; and
determine the image differential metric by utilizing the canvas worker container to compare the first version of the digital image reflected in a first transmission of the digital stream and the second version of the digital image reflected in a second transmission of the digital stream.

15. A computer-implemented method comprising:
receiving an indication of a user interaction from a client device for remotely editing a digital image utilizing an interactive image editing architecture comprising a canvas worker container and a set of graphical processors;
generating a modification to the digital image utilizing the set of graphical processors according to the user interaction;
comparing, from a digital stream that reflects versions of the digital image and utilizing the canvas worker container, a first version of the digital image that is unmodified and a second version of the digital image reflecting the modification;
determining an image differential metric indicating the modification according to comparing the first version and the second version utilizing the canvas worker container; and
providing the image differential metric to the client device for rendering the digital image in the second version to reflect the modification.

16. The computer-implemented method of claim 15, further comprising:
generating a latent image vector representing the digital image; and
wherein generating the modification to the digital image comprises modifying the latent image vector.

17. The computer-implemented method of claim 15, wherein comparing the first version of the digital image and the second version of the digital image comprises determining a difference between a first latent image vector associated with the first version and a second image latent vector associated with the second version.

18. The computer-implemented method of claim 15, wherein the interactive image editing architecture comprises a container orchestration engine that coordinates execution of the canvas worker container, a graphical processing container corresponding to the set of graphical processors, and a backend editing container corresponding to a backend editing controller.

19. The computer-implemented method of claim 15, further comprising utilizing the canvas worker container to generate modification batches to fill a graphical processing capacity of the set of graphical processors for modifying digital images.

20. The computer-implemented method of claim 15, further comprising utilizing the canvas worker container to maintain the digital stream that reflects versions of the digital image to indicate modifications corresponding to user interactions.

* * * * *